(12) United States Patent
Hyde et al.

(10) Patent No.: US 10,828,533 B2
(45) Date of Patent: Nov. 10, 2020

(54) PERSONAL THERAPY AND EXERCISE MONITORING AND OVERSIGHT DEVICES, SYSTEMS, AND RELATED METHODS

(71) Applicant: Elwha LLC, Bellevue, WA (US)

(72) Inventors: Roderick A. Hyde, Redmond, WA (US); Katherine E. Sharadin, Redmond, WA (US); Elizabeth A. Sweeney, Seattle, WA (US)

(73) Assignee: ELWHA LLC, Bellevue, WA (US)

( * ) Notice: Subject to any disclaimer, the term of this patent is extended or adjusted under 35 U.S.C. 154(b) by 446 days.

(21) Appl. No.: 15/440,795

(22) Filed: Feb. 23, 2017

(65) Prior Publication Data

US 2018/0236307 A1    Aug. 23, 2018

(51) Int. Cl.
*A63B 24/00*        (2006.01)
*G09B 5/02*         (2006.01)
(Continued)

(52) U.S. Cl.
CPC .......... *A63B 24/0075* (2013.01); *A61H 1/00* (2013.01); *A61H 3/00* (2013.01); *A61H 7/001* (2013.01); *A63B 24/0062* (2013.01); *G09B 5/02* (2013.01); *G09B 5/04* (2013.01); *G09B 19/003* (2013.01); *G09B 19/0038* (2013.01); *A61H 2201/165* (2013.01); *A61H 2201/5061* (2013.01); *A61H 2201/5064* (2013.01); *A61H 2201/5069* (2013.01); *A61H 2201/5071* (2013.01); *A61H 2201/5076* (2013.01); *A61H 2201/5079* (2013.01); *A61H 2201/5082* (2013.01); *A61H 2201/5084* (2013.01); *A61H 2201/5089* (2013.01); *A61H 2201/5092* (2013.01); *A61H 2230/08* (2013.01); *A61H 2230/085* (2013.01); *A61H 2230/20* (2013.01); *A61H 2230/201* (2013.01); *A61H 2230/207* (2013.01); *A61H 2230/62* (2013.01); *A61H 2230/625* (2013.01); *A63B 21/026* (2013.01); *A63B 21/0552* (2013.01); *A63B 21/06* (2013.01); *A63B 21/0724* (2013.01); *A63B 22/0076* (2013.01); *A63B 22/02* (2013.01); *A63B 22/0605* (2013.01); *A63B 22/0664* (2013.01);

(Continued)

(58) Field of Classification Search
None
See application file for complete search history.

(56) References Cited

U.S. PATENT DOCUMENTS 6,273,863 B1    8/2001  Avni et al.
6,613,000 B1    9/2003  Reinkensmeyer et al.
(Continued)

FOREIGN PATENT DOCUMENTS

EP    2996551         3/2016
WO    2014186537     11/2014

OTHER PUBLICATIONS

PCT International Search Report; International App. No. PCT/US2018/018700; dated May 21, 2018; pp. 1-3.
(Continued)

*Primary Examiner* — Jason T Yen
(74) *Attorney, Agent, or Firm* — Dorsey & Whitney LLP

(57) ABSTRACT

Embodiments disclosed herein are directed to personal therapy and exercise systems as well as to methods related thereto. For example, a personal therapy system can be a modular system that can include multiple therapy gear modules.

44 Claims, 6 Drawing Sheets

(51) Int. Cl.

| | |
|---|---|
| G09B 5/04 | (2006.01) |
| G09B 19/00 | (2006.01) |
| A61H 1/00 | (2006.01) |
| A61H 3/00 | (2006.01) |
| A61H 7/00 | (2006.01) |
| A63B 21/06 | (2006.01) |
| A63B 22/06 | (2006.01) |
| A63B 21/072 | (2006.01) |
| A63B 71/06 | (2006.01) |
| A63B 22/00 | (2006.01) |
| A63B 22/02 | (2006.01) |
| A63B 21/02 | (2006.01) |
| A63B 21/055 | (2006.01) |

(52) U.S. Cl.
CPC ... *A63B 2071/063* (2013.01); *A63B 2071/065* (2013.01); *A63B 2071/0655* (2013.01); *A63B 2220/30* (2013.01); *A63B 2220/40* (2013.01); *A63B 2220/50* (2013.01); *A63B 2220/56* (2013.01); *A63B 2220/805* (2013.01); *A63B 2220/833* (2013.01); *A63B 2225/50* (2013.01); *A63B 2225/54* (2013.01); *A63B 2230/045* (2013.01); *A63B 2230/085* (2013.01); *A63B 2230/425* (2013.01); *A63B 2230/438* (2013.01)

(56) References Cited

U.S. PATENT DOCUMENTS

| | | | |
|---|---|---|---|
| 6,716,034 B2 | 4/2004 | Casanova, Jr. et al. | |
| 2006/0189440 A1* | 8/2006 | Gravagne | A63B 24/00 482/8 |
| 2011/0070569 A1* | 3/2011 | Martens | A63B 21/0726 434/247 |
| 2014/0094345 A1* | 4/2014 | Kim | A63B 21/4009 482/7 |
| 2014/0142459 A1* | 5/2014 | Jayalth | A61B 5/0022 600/547 |
| 2014/0248996 A1* | 9/2014 | Adel | A63B 24/0062 482/8 |
| 2014/0363800 A1* | 12/2014 | Harris | G09B 19/003 434/247 |
| 2015/0251055 A1* | 9/2015 | Ashby | G09B 19/0038 482/8 |
| 2016/0067136 A1 | 3/2016 | Raghavan et al. | |
| 2016/0322078 A1* | 11/2016 | Bose | G11B 27/031 |
| 2017/0106240 A1* | 4/2017 | Chuang | A63B 21/0726 |
| 2017/0281079 A1* | 10/2017 | Nachman | A61B 5/4866 |
| 2018/0000468 A1 | 1/2018 | O'Neil et al. | |
| 2018/0243155 A1 | 8/2018 | Angold et al. | |

OTHER PUBLICATIONS

U.S. Appl. No. 14/469,169, filed Aug. 26, 2014, Cheatham et al.

Reed, K., et al. "Home-based rehabilitation: enabling frequent and effective training," accessed Oct. 11, 2016 at http://reedlab.eng.usf.edu/publications/reed2014homeRehab.pdf.

"MedGizmo: Wearables and Rehabilitation", MedGizmo website, published Nov. 22, 2015, accessed Oct. 11, 2016 at http://medgizmo.info/news/medgizmo-wearables-and-rehabilitation.

Odenserobotics: "BandCizer: Company Profile," accessed Oct. 11, 2016 at http://www.odenserobotics.dk/network/bandcizer/.

HealthTech Event: "BandCizer exhibits at Health Tech Event," posted Dec. 8, 2014, accessed Oct. 11, 2016 at http://www.healthtechevent.com/wp-content/uploads/2014/12/BandCizer-Anders-Stengaard.pdf.

Assess2Perform, "Your Training Counts," website accessed on Oct. 11, 2016 at http://assess2perform.com/.

New York University, Smartphone Integrated Stroke Rehabilitation, accessed on Oct. 11, 2016 at http://dam.poly.edu/pages/preview.php?ref=46901&ext=png&k=9d9a1f97b4&search=%21collection1743&offset=0&order_by=relevance&sort=DESC&archive=0& [Kapila].

Horak, F., et al. "Role of body-worn movement monitor technology for balance and gait rehabilitation," Phys Ther. Mar. 2015;95(3):46 1-70. doi: 10.2522/ptj.20 1 40253. Epub Dec. 11, 2014.

Koh, G.C., et al. "Singapore Tele-technology Aided Rehabilitation in Stroke (STARS) trial: protocol of a randomized clinical trial on tele-rehabilitation fo r stroke patients, "BMC Neural. Sep. 5, 2015; 15:1 61. doi: 10.1186/s 1 2883-015-0420-3.

Rapael Smart Glove for Hand Rehab, accessed on Oct. 11, 2016 at http://www.neofect.com/en/product/rapael/.

Fulk, G.D., et al. "Using sensors to measure activity in people with stroke," Top Stroke Rehabil. Nov.-Dec. 2011; 18(6):746-57.doi:10.1310/tsr1806-746.

Hegde, N. et al, Development of the RT-GAIT, a Real-Time feedback device to improve Gait of individuals with stroke, Conf Proc IEEE Eng Med Biot Soc. Aug. 2015:2015:5724-7, doi: 10.1109/EMBC.2015.7319692.

Step of Mind, Re-Step Rehabilitation System, accessed on Oct. 11, 2016 at http://www.stepofmind.com/.

Zhang,. S., et al. "Design of a novel telerehabilitation system with a force-sensing mechanism," Sensors (Basel). May 19, 2015; 15(5]: 11511-27, doi: 10.3390/s 150511511.

Farulla, G.A., "Vision-Based Pose Estimation for Robot-Mediated Hand Telerehabilitation," Sensors (Basel) Feb. 5, 2016; 16(2):208. doi: 10.3390/s 16020208.

Gudeman, K., et al. "Illinois Researchers Developing Technology to Assist in-home-Rehab Care," CSL Coordinated Science Lab, published Oct. 15, 2015, at https://csl.illinois.edu/news/illinois-researchers-developing-new-technology-assist-home-rehab-care.

Proffitt R, et al. "Feasibility of a Customized, In-Home, Game-Based Stroke Exercise Program Using the Microsoft Kinect® Sensor," Int J Telerehobil. Nov. 20, 2015;7(2):23-34. doi: 10.5195/ijt.2015.6177.eCollection 2015 Fall.

Brandao, A.F., et al. "RehabGesture: An Alternative Tool for Measuring Human Movement," Telemed J E Health. Jul. 2016;22(7);584-9. doi: 10.1089/tmj.2015.0139. Epub May 12, 2016.

Langan, J., et al. "Home-Based Telerehabilitation Shows Improved Upper Limb Function in Adults with Chronic Stroke: A Pilot Study," J Rehabil Med. Feb. 2013; 45(2): 217-220. http://www.ncbi.nlm.nih.gov/pmc/articles/PMC4104503/.

\* cited by examiner

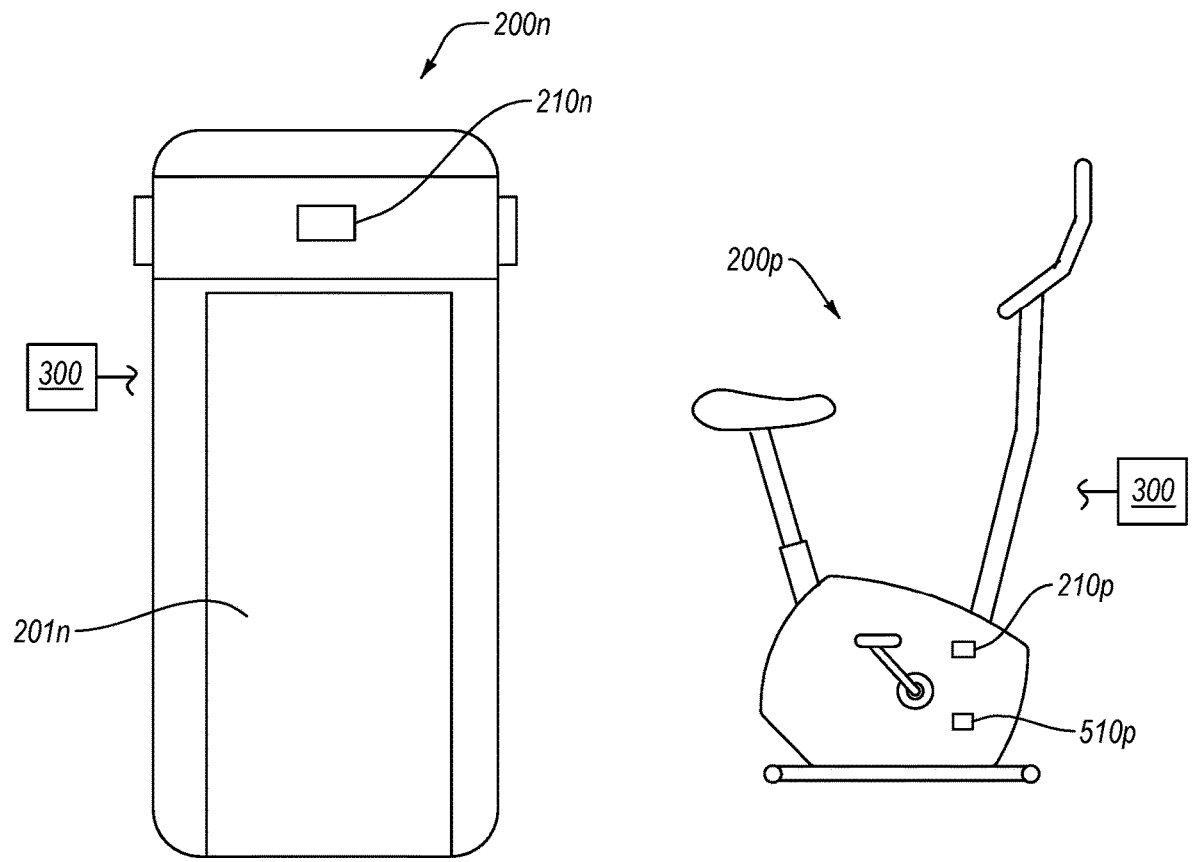
FIG. 7
FIG. 8
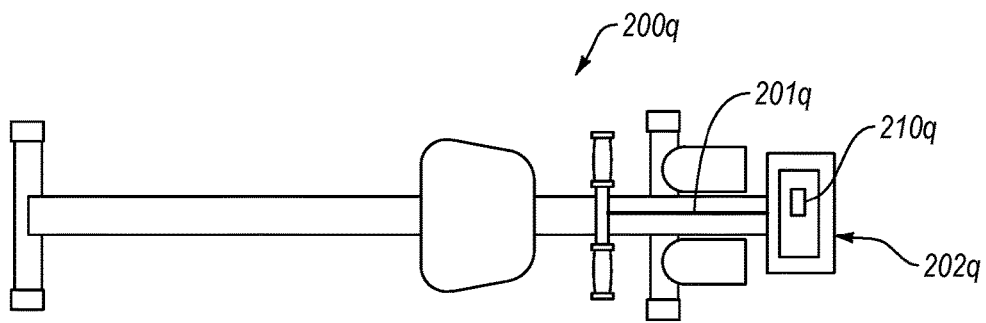
FIG. 9

PERSONAL THERAPY AND EXERCISE MONITORING AND OVERSIGHT DEVICES, SYSTEMS, AND RELATED METHODS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

None.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

BACKGROUND

Generally, improving an individual's physical condition involves exercise or training, such as to improve strength, flexibility, stamina, agility, range of movement, etc. For example, an individual who was injured may benefit from physical therapy that can include various exercise regimens.

Therefore, manufacturers, users, and designers of exercise and training systems continue to seek improvements thereto.

SUMMARY

Embodiments disclosed herein are directed to personal therapy and exercise systems as well as to methods related thereto. For example, a personal therapy system can be a modular system that can include multiple therapy gear modules. Specifically, for example, a subject can access a first therapy gear module during a first stage or phase of therapy and a second therapy gear module during a second (subsequent) stage or phase of the therapy. In an embodiment, the therapy system can include a therapy controller and one or more sensors that can detect one or more subject-related conditions or one or more therapy-gear-module-related conditions; based on the conditions detected by the sensors, the therapy controller can allow or inform the subject to access one or more new therapy gear modules (e.g., to advance subject's treatment or exercise program).

An embodiment includes a modular personal therapy system that includes a plurality of therapy gear modules. Each of the plurality of therapy gear modules has a selected difficulty setting. The plurality of therapy gear modules include one or more current therapy gear modules usable by a subject. The modular personal therapy system also includes one or more sensors positioned and configured to detect one or more therapy conditions, and a controller including control electrical circuitry that is configured to receive one or more signals from the one or more sensors, identify one or more new therapy gear modules of the plurality of therapy gear modules for the subject responsive to the one or more signals received from the one or more sensors, and generate one or more gear access outputs configured to provide the subject access to the one or more new therapy gear modules.

An embodiment includes a method of providing personal therapy to a subject. The method includes at a controller, receiving one or more signals from one or more sensors configured to detect one or more of movement of one or more body portions of the subject or change in position of one or more portions of one or more current therapy gear modules used by the subject. The method also includes at the controller, identifying one or more new therapy gear modules for the subject responsive to the one or more signals received from the one or more sensors, and at the controller, generating one or more access outputs to provide the subject access to the identified one or more new therapy gear modules.

Embodiments also include a modular personal therapy system that includes one or more sensors configured to detect one or more therapy conditions for a subject, and a controller including control electrical circuitry that is configured to: receive one or more signals from the one or more sensors, identify a configuration for the at least one new therapy gear module of the plurality of therapy gear modules for the subject responsive to the one or more signals received from the one or more sensors, and generate one or more gear determination outputs configured to request fabrication of the at least one new therapy gear module having the identified configuration. The modular personal therapy system also includes a gear fabrication module configured to fabricate the at least one new therapy gear module having the selected configuration, responsive to receiving the one or more determination outputs.

At least one embodiment includes a method of providing personal therapy to a subject. The method includes, at a controller, receiving one or more signals from one or more sensors configured to detect one or more of movement of one or more body portions of the subject or change in position of one or more portions of one or more current therapy gear modules used by the subject. The method also includes, at the controller, identifying one or more new therapy gear modules for the subject responsive to the one or more signals received from the one or more sensors. Moreover, the method includes at the controller, generating one or more gear determination outputs configured to request fabrication of the at least one new therapy gear module having a selected configuration. The method also includes, responsive to receiving the one or more determination outputs at a gear fabrication module, fabricating the at least one new therapy gear module having the selected configuration.

One or more embodiments include modular personal therapy system that includes a plurality of therapy gear modules, each of the plurality of therapy gear modules having a selected difficulty setting, one or more sensors positioned and configured to detect one or more therapy conditions, and a controller including control electrical circuitry. The control electrical circuitry of the controller is configured to receive one or more signals from the one or more sensors, identify one or more physical conditions of the subject, and generate one or more reports responsive to the identified one or more physical conditions of the subject.

Features from any of the disclosed embodiments can be used in combination with one another, without limitation. In addition, other features and advantages of the present disclosure will become apparent to those of ordinary skill in the art through consideration of the following detailed description and the accompanying drawings.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 7 is a schematic illustration of a therapy gear module for a therapy system, according to an embodiment.

FIG. 8 is a schematic illustration of a therapy gear module for a therapy system, according to an embodiment.

FIG. 9 is a schematic illustration of a therapy gear module for a therapy system, according to an embodiment.

DETAILED DESCRIPTION

Embodiments disclosed herein are directed to personal therapy and exercise systems as well as to methods related thereto. For example, a personal therapy system can be a modular system that can include multiple therapy gear modules. Specifically, for example, a subject can access a first therapy gear module during a first stage or phase of therapy and a second therapy gear module during a second (subsequent) stage or phase of the therapy. In an embodiment, the therapy system can include a therapy controller and one or more sensors that can detect one or more subject-related conditions or one or more therapy-gear-module-related conditions; based on the conditions detected by the sensors, the therapy controller can allow or inform the subject to access one or more new therapy gear modules (e.g., to advance subject's treatment or exercise program).

In some embodiments, the controller of the therapy system can determine that the subject has reached a selected performance goal or objective. For example, after detecting or determining that the subject has reached a selected or predetermined level of performance (e.g., amount of weight lifted, number of repetitions, flexibility demonstrated, range of motion, etc.), the controller can activate or can make available to the subject one or more new therapy gear modules. Hence, in some embodiments, the therapy system can be used by the subject without interfacing with a trainer or physical therapist.

Figure 1:
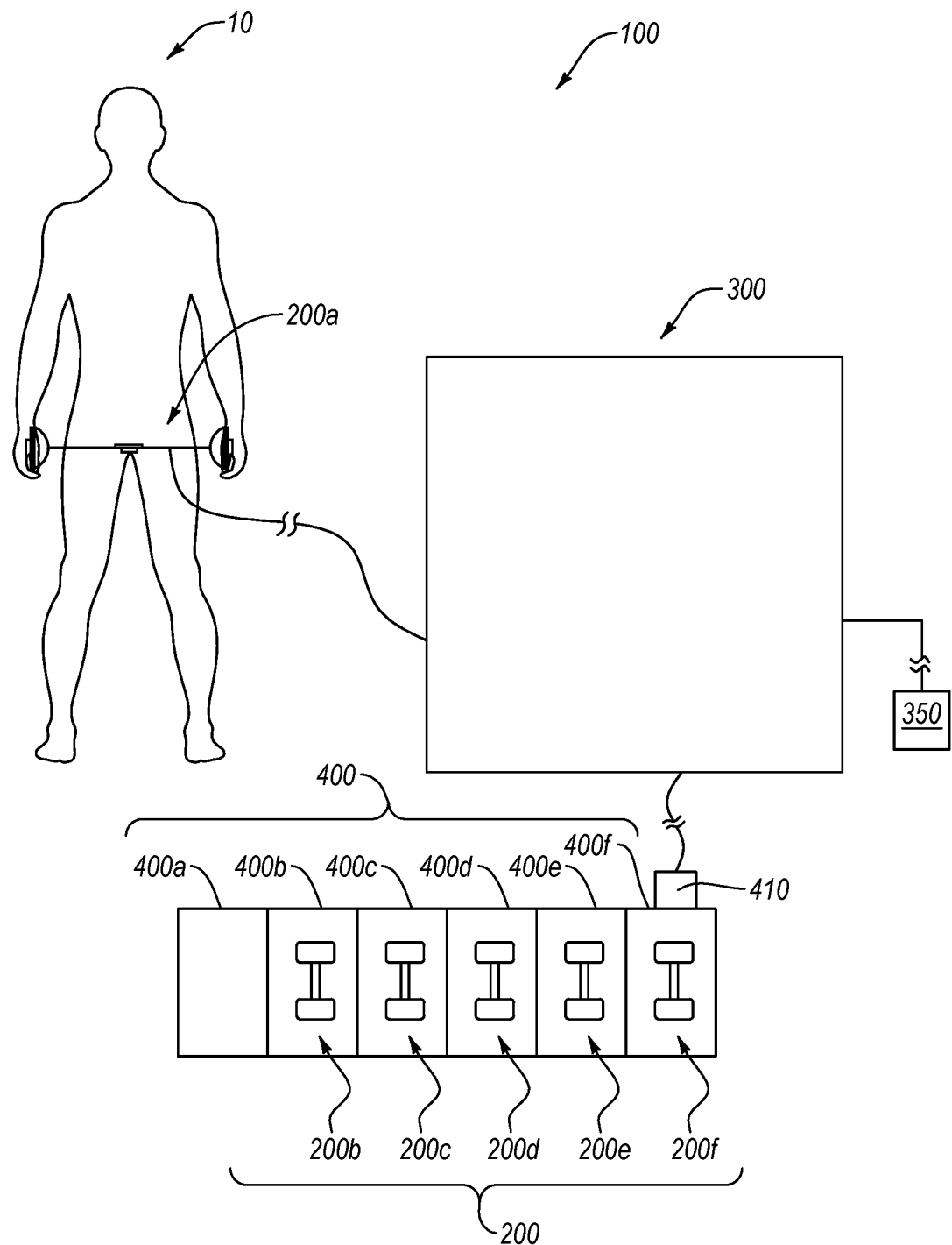
FIG. 1 is a schematic illustration of a subject using a therapy system, according to an embodiment.

FIG. 1 is a schematic illustration of a therapy system 100, according to an embodiment. A subject 10 can access the therapy system 100 or one or more elements or components thereof for personal training, rehabilitation training, physical therapy, stroke rehabilitation, occupational therapy, etc. Specifically, the therapy system 100 can include one or more therapy gear modules 200a-200f and a therapy controller 300 that is operably coupled to at least one of the therapy gear modules 200 (e.g., to one or more of therapy gear modules 200a, 200b, 200c, 200d, 200e, 200f). The therapy gear modules 200 are illustrated schematically as blocks. It should be appreciated that, as described below in more detail, the therapy gear modules 200 can include any number of suitable therapy gear modules that can be similar to one another or different from one another (e.g., can be the same or different types of exercise equipment). Moreover, it should be appreciated that, while FIG. 1 shows that the therapy gear modules 200 including six therapy gear modules 200a-200f, other embodiments can include any number of therapy gear modules 200, which can vary from one embodiment to the next.

In an embodiment, the therapy controller 300 can be configured to allow the subject 10 to access any of the therapy gear modules 200 (e.g., based on one or more therapy conditions, as described below in more detail). The therapy controller 300 can be operably coupled to one or more sensors 350 that can detect one or more therapy conditions. For example, the therapy controller 300 can receive one or more signals from the sensors and identify one or more new therapy gear modules of the plurality of therapy gear modules for the subject responsive to the one or more signals received from the one or more sensors. Furthermore, the therapy controller 300 can be configured to generate one or more gear access outputs configured to provide the subject access to the one or more new therapy gear modules. Generally, sensors can vary from one embodiment to the next. In some embodiments, the sensors can include a force sensor, a torque sensor, an acceleration sensor, a pressure sensor, a tactile sensor, a kinesiometer, a goniometer, an optical sensor (e.g., a light sensor), or an inclinometer.

The sensors can be positioned on or near the subject 10 (e.g., as described below in connection with FIG. 11)). Additionally or alternatively, the sensors can be positioned on one or more portions of one, some, or each of the therapy gear modules 200. Hence, the sensors can detect any number of therapy conditions that can be suitable for determining the physical level or performance level of the subject 10 or selecting or identifying a new therapy gear module. For example, therapy conditions that can be detected by the one or more sensors can include movement of one or more body portions of the subject 10, change in position of one or more portions of one or more current therapy gear modules (e.g., of the therapy gear module 200a) of the therapy gear modules 200, magnitude of force applied to one or more portions of one or more current therapy gear modules (e.g., of one or more portion of the therapy gear module 200a), direction of force applied to one or more portions of one or more current therapy gear modules (e.g., of one or more portion of the therapy gear module 200a), or combinations of the foregoing.

Generally, the therapy gear modules 200 can include any number of different exercise devices or systems that can vary from one embodiment to the next. For example, the therapy gear modules 200 can include one or more of a resistance trainer (e.g., an elastic band), a stress ball, a stability training gear, weights, a weighted ball, a hand-strengthening ball, a passive device (e.g., a compression garment, a transcutaneous electrical nerve stimulation unit or device (TENS unit), a treadmill, a cycle, or a rowing machine. Furthermore, suitable resistance trainers can include at least one of a band, a bar, a ball, clay, a sponge, a foam, gel-filled ball, an electrically controlled load generator or tension modulator, or a tensioned spring. In some embodiments, one or more therapy gear modules 200 can include at least one of audio instruction, visual instruction, or tactile instruction.

Moreover, the plurality of therapy gear modules 200 can include at least one therapy gear module configured to apply a force onto or move one or more body portions of the subject 10 (e.g., compression garments, exoskeleton, etc.). In some embodiments, the therapy gear modules 200 can include one or more compression garments that can be configured to be worn on one or more portions of the subject's body. Examples of suitable compression garments that can be used in any of the embodiments disclosed herein are more fully described in U.S. patent application Ser. No. 14/469,169 filed on Aug. 26, 2014, the entire content of which is incorporated herein by this reference. In an embodiment, the therapy system controller can modify one or more parameters of the compression garment. Additionally or alternatively, the therapy system controller 300 can identify one or more new therapy gear modules (e.g., that can include compression garments) and generate one or more corresponding gear access outputs (e.g., to allow the subject to allow the subject to access the corresponding therapy gear modules).

In some embodiments, the therapy controller 300 can be configured to activate or deactivate one or more of the therapy gear modules 200. For example, the therapy controller 300 can receive one or more detection signals from the sensors (described above) and based on the signals can deactivate the therapy gear module 200a and activate the therapy gear module 200b (e.g., the therapy gear module 200b can have a higher difficulty level than the therapy gear module 200a or vice versa). In some embodiments, the new therapy gear module can have the same difficulty as the current therapy gear module (e.g., the therapy gear module 200b can have the same difficult as the therapy gear module 200a) but can be used together with the current therapy gear module, such that the combined therapy gear modules have a higher level of difficulty than the current module. For example, two elastic bands can be used together to increase the difficulty level.

In an embodiment, the therapy controller 300 can be configured to generate one or more gear access outputs that can activate one or more of the therapy gear modules 200 or deactivate one or more of the therapy gear modules 200. Additionally or alternatively, the gear access outputs can provide access to one or more therapy gear modules of the therapy gear modules 200 (e.g., the subject 10 can be using the therapy gear module 200a and the gear access output can be configured to provide the 10 with access to the therapy gear module 200b, as described below in more detail). For example, the therapy controller 300 can be configured to determine performance or exercise level of the subject 10 and, based on the determined level, generate one or more gear access outputs.

In some embodiments, the therapy controller 300 can include or can be operably coupled to a database, a lookup table, or other suitable data structure (e.g., data structure that may be configured for storing data in the memory, on a storage device, or retrieve the data therefrom) that includes one or more conditions (e.g., performance levels for the subject 10, signals received from one or more sensors, etc.) and corresponding one or more exercises to be performed by the subject, therapy gear modules recommended for use by the subject, combinations thereof, etc. For example, responsive to or based on receiving one or more signals from one or more sensors (e.g., signals corresponding to or representative of a selected performance level achieved by the subject 10), the therapy controller 300 can be configured to generate one or more gear access outputs.

In an embodiment, the gear access outputs or the identifiers of therapy gear modules (e.g., serial numbers, barcodes, etc.) can be stored in a database or lookup table and can be correlated with the corresponding performance levels or sensor signals (e.g., signal levels, patterns, etc., as received by the therapy controller 300 from the sensors). Moreover, the gear access outputs or values corresponding to the gear access outputs (e.g., therapy gear module identifiers) can be stored in the database or table and can be correlated with the one or more sensor signals. For example, the therapy controller 300 can provide access to one or more of the therapy gear modules 200 or activate/deactivate one or more of the therapy gear modules 200 by correlating the received signals to one or more gear access outputs.

In an embodiment, one, some, or each of the therapy gear modules 200 can have a corresponding identifier that can identify the specific type of the therapy gear modules 200, the specific unit of the therapy gear modules 200 (e.g., for inventory and access control), etc. Suitable authentication identifiers can vary from one embodiment to the next and from one therapy gear module to another. For example, as described above, therapy gear modules 200 can include exercise equipment or medical devices (e.g., exercise bands) or audiovisual gear modules (e.g., audio and/or visual instructions). Hence, in some embodiments, the specific suitable authentication identifier can vary based at least partially on the type of the therapy gear module.

As described above, in some embodiments, the therapy controller 300 can generate gear access output(s) that can be configured to provide subject with access to one or more of the therapy gear modules 200. In an embodiment, the gear access output(s) can include or can be based at least partially on one or more gear authentication identifiers. That is, for example, the gear access output can be related to the specific authentication identifiers that are associated with specific therapy gear modules identified by the therapy controller 300 (e.g., new therapy gear module, such as the therapy gear module 200b that can replace the current therapy gear module 200a, which is being used by the subject 10). In some embodiments, the authentication identification can be a serial number, a universal product number (UPC), a stock keeping unit (SKU) number, barcode number, Radio-Frequency Identification (RFID), etc.

Moreover, with respect to identifying therapy gear modules that include physical objects, a physical authentication identifier can be attached or otherwise included or integrated with the corresponding therapy gear module. In an embodiment, the authentication identifier can be detectable (e.g., barcode, RFID, etc.) by one or more gear-identifier detectors (e.g., scanners, sensors, etc.) that can be operably coupled to the therapy controller 300. The gear-identifier detector can have a wired or wireless coupling to the therapy controller 300.

The therapy controller 300 can keep inventory of the therapy gear modules 200 and can allow the subject 10 to access one or more of the therapy gear modules 200 by generating one or more gear access outputs that can be based on or include the authentication identifier of the specific therapy gear module(s), such that the subject 10 can access only the therapy gear modules that have been identified by the therapy controller 300. In any event, in at least one embodiment, the gear-identifier detector(s) can be configured to identify at least one of the therapy gear modules 200 based on the one or more gear authentication identifiers.

As described above, the therapy gear modules 200 can include any number of suitable therapy gear modules. In an embodiment, the therapy gear modules 200 can include one or more informational gear modules that can be configured to provide at least one of audio instruction, visual instruction, tactile instruction, which can be based at least partially on one or more gear authentication identifiers or one or more gear access outputs that can include one or more gear authentication identifiers. For example, the informational gear modules can include or can be associated with any number of suitable hardware that can store or deliver the instructions of the informational gear modules. Suitable hardware can include a storage drive (e.g., flash drive, CD ROM, hard drive, etc.), a suitable computing device, such as a generic computer and network connection (e.g., local network (wired or wireless), the Internet, cellular network, etc.).

Furthermore, one or more of the therapy gear modules 200 can include a therapy-gear controller (described below in more detail) that can include controller electrical circuitry that is configured to receive one or more access outputs from the therapy controller 300. For example, responsive to receiving the access outputs from the therapy controller 300, the therapy-gear controller can activate the therapy gear module that corresponds to the gear access output(s).

In an embodiment, one or more of the therapy gear modules 200 can include at least one sensor. For example, the control electrical circuitry of the therapy controller 300 can be configured to accept signals from the sensor(s) included on or with one or more of the therapy gear modules 200 and can ignore signals from other sensors responsive to the or based on the identification of the one or more new therapy gear modules. In an embodiment, the therapy controller 300 can be configured to accept or ignore sensor signals (from the sensor(s) of the therapy gear modules 200) based on or responsive to one or more gear access outputs. For example, the therapy controller 300 can accept sensor signals from the sensors on the new therapy gear module (e.g., on the therapy gear module 200*b*, as identified or activated by the therapy-gear controller 300 and ignore signals from the previous therapy gear module (e.g., from therapy gear module 200*a* that can be deactivated by the therapy controller 300).

For example, the therapy controller 300 can include a database or lookup table that can correlate one, some, or each of the therapy gear modules 200 with corresponding sensors or sensor identifiers. Additionally or alternatively, the therapy controller 300 can send a verification or authentication signal (e.g., which can be included in the gear access output(s)) to the therapy gear modules 200; the gear controller can send a response signal to the therapy controller 300 that can include one or more identifiers for the sensor(s) included on or in the therapy gear modules 200. For example, the sensors can include specific identifiers that can be correlated to the identifiers of the therapy gear modules 200, such as the authentication identifiers.

In some embodiments, the sensors on the therapy gear modules 200 that are not in use by the subject 10 or that have not been authorized by the therapy controller 300 for use can be inactive or deactivated. Additionally or alternatively, as described above, the therapy controller 300 can ignore signals from the therapy gear modules 200 that are not in use by the subject 10 or that have not been authorized by the therapy controller 300 for use. For example, as described below in more detail, based on the signals received from the activated sensors or from the sensors that are not filtered out or ignored, the therapy controller 300 can determine performance of the subject 10, as the subject 10 uses one or more of the therapy gear modules 200 that include the activated sensors.

Moreover, the subject 10 can receive feedback (e.g., real-time feedback) from the therapy controller 300 based on the signals received from the sensors that are included on the therapy gear modules 200 being used by the subject or sensors that are otherwise configured to sense motion. For example, the feedback may include information about the force applied by the subject 10 to one or more portions of at least one of the therapy gear modules 200. For example, as described below in more detail, the therapy controller 300 can include or can be operably coupled to an output device (e.g., display, speaker, tactile output device, etc.) that can give feedback to the subject 10. In an embodiment, the therapy controller 300 can include or can be operably coupled to a personal electronic device (e.g., smart phone, smart watch, etc.). For example, the personal electronic device can be positioned near or on the subject 10, such that the subject 10 can receive the output from the personal electronic device. Hence, for example, if the subject 10 starts using one of the therapy gear modules 200 that does not have activated sensors, or if the signals from the sensors of the selected therapy gear module of the therapy gear modules 200 are ignored by the therapy controller 300, the subject 10 will not receive feedback from the therapy controller 300 and can choose to switch to another therapy gear module of the therapy gear modules 200, which has been activated.

In an embodiment, one, some, or each of the therapy gear modules 200 that have been activated can include an activation indicator (e.g., a light, such as green for activated, red for not active, yellow for pending activation, etc., a message, or other suitable indicators that can indicate the status of activation). For example, one or more gear access outputs (that can include or can be based at least partially on one or more authentication identifiers) can activate the activation indicator(s) on the new therapy gear module of the therapy gear modules 200 (e.g., based on the therapy gear module 200*b* that can replace the therapy gear module 200*a* for the subject 10) in addition to activating the sensors therefor or activating acceptance of signals from the sensors thereof.

The therapy controller 300 can also deactivate or change activation indicators on the therapy gear module(s) of the therapy gear modules 200 that have been deactivated (e.g., after selection, activation, or receipt of another or new therapy gear module). For example, after the therapy controller 300 selects or activates the therapy gear module 200*b* or the subject 10 receives the therapy gear module 200*b*, the activation indicators on the therapy gear module 200a can be turned off or changed to indicate to the subject 10 that the therapy controller 300 is no longer receiving signals from the sensors of the therapy gear module 200a. Additionally or alternatively, the output device that is operably coupled to or integrated with electrical circuitry of the therapy controller 300 can indicate or message to the subject 10 that one therapy gear module (e.g., therapy gear module 200b) is active or that another therapy gear module (e.g., therapy gear module 200a) is inactive.

In some embodiments, one, some, or each of the therapy gear modules 200 can be secured in one or more corresponding containers, and the therapy controller 300 can allow the subject 10 to access one or more of such containers. For example, the therapy system 100 can include storage containers 400 (e.g., storage containers 400a, 400b, 400c, 400d, 400e, 400f). In an embodiment, the therapy gear modules 200 (e.g., therapy gear modules 200a, 200b, 200c, 200d, 200e, 200f) can be stored or secured in corresponding storage containers 400 (e.g., containers storage containers 400a, 400b, 400c, 400d, 400e, 400f).

Generally, the storage containers 400 can have any number of suitable shapes, sizes, configurations, etc. In some embodiments, the storage containers 400 can include or can be configured as a lockbox, a vending machine, combinations thereof, etc. For example, one, some, or each of the storage containers 400 can be sized and configured as shipping storage. Additionally or alternatively, one, some, or each of the storage containers 400 can be configured as vending machines or different storage compartments in the same vending machine. In any event, the storage containers 400 can be configured to secure the therapy gear modules 200 and provide access thereto responsive to one or more gear access outputs generated by the therapy controller 300.

In an embodiment, after receiving the gear access outputs, the container controller 410 can open a corresponding compartment or multiple compartments of the storage containers 400, thereby providing the subject 10 with access to the selected therapy gear modules 200 (e.g., to one or more new therapy gear modules). For example, the container controller 410 can operate the storage container 400b (e.g., can operate a door, a lock, etc.) in the manner to allows the subject 10 to access the contents of the storage container 400b, such as the therapy gear module 200b that can be stored in the storage container 400b.

In an embodiment, one, some, or each of the storage containers 400 can be operably coupled to the therapy controller 300. For example, one, some, or each of the storage containers 400 can include a container controller, such as a container controller 410 that can include control electrical circuitry operably coupled to the control electrical circuitry of the therapy controller 300. The container controller 410 can receive one or more signals from the therapy controller 300 (e.g., one or more gear access outputs) or can send one or more signals thereto. For example, responsive to the received signals from the therapy controller 300, the container controller 410 can provide the subject 10 with access to one or more of the therapy gear modules 200 (e.g., as described above).

As mentioned above, the container controller 410 can control multiple storage containers 400 (e.g., can be operably connected to multiple lock boxes, multiple compartments, etc., of the storage containers 400). Additionally or alternatively, each of the storage containers 400 can have a separate container controller that can be similar to the container controller 410. In any event, according to one or more embodiments, the container controller 410 can receive one or more gear access outputs and can open access to or otherwise unlock one or more of the therapy gear modules 200 that correspond to the new therapy gear modules identified by the therapy controller 300.

In an embodiment, the gear access output can include one or more access codes. For example, the subject 10 can receive the access code (e.g., via one or more output devices that can be operably coupled to the therapy controller 300, as described above, such as at one or more output devices of a smart phone, smart watch, etc.). Furthermore, the container controller 410 can include one or more input devices operably coupled to the control electrical circuitry thereof or integrated therewith. Specifically, for example, the subject 10 can enter the access code provided by the therapy controller 300 at the input device(s) of the container controller 410 and can thereby access therapy gear module(s) stored in the storage containers of the storage containers 400 that container controller 410 can open responsive to the entry of the access code.

Additionally or alternatively, the container controller 410 can include or can be coupled to an input device that is a card or a fob reader. For example, the input device can read one or more identification cards that can provide the access code(s) to the container controller 410. In an embodiment, the therapy controller 300 (or the control electrical circuitry thereof) can be operably coupled or coupleable to a memory storage device, such as a flash card, flash drive or fob, personal electronic device, etc. The therapy controller 300 can be configured to transfer access code or data that corresponds to the one or more gear access outputs that can include the access code to the storage device. Moreover, the container controller 410 can be operably coupled or coupleable to the storage device and can retrieve or receive the data therefrom, which can contain the one or more gear access outputs or the access code. In some embodiments, instead of entering the access code at the input device of the container controller 410 (e.g., at a keyboard or similar device), the subject 10 can couple the storage device (that includes the access code) to the container controller 410, and the container controller 410 can thereby receive the access code and provide the subject 10 with the access to the new therapy gear module. For example, the subject 10 can insert a fob that has the access code into the reader.

In an embodiment, the container controller 410 can include or can be operably coupled to a database or a table that correlates the access codes with corresponding therapy gear modules 200 or storage containers 400. Hence, for example, after the container controller 410 receives the access code, the container controller 410 can determine or identify the storage container of the storage containers 400 that correspond to the received access code and can provide access thereto, such that the subject 10 can retrieve the new therapy gear module (e.g., the therapy gear module 200b) therefrom.

In some embodiments, the container controller 410 and the storage containers 400 can be configured to provide one-time access to the new therapy gear module (e.g., to the therapy gear module 200b). For example, the container controller 410 can direct the storage container 400b to open or unlock only one time, such that the subject 10 can retrieve the therapy gear module 200b therefrom. Alternatively, the container controller 410 can be configured to provide the subject 10 multiple accesses to the new therapy gear module (e.g., to the therapy gear module 200b). For example, the container controller 410 can be configured such that after container controller 410 receives the access code, the container controller 410 can open or unlock the storage container 400b to provide access to the therapy gear module 200b a selected number of times or an unlimited number of times.

In some embodiments, the therapy controller 300 can send one or more signals directly to the container controller 410, and the signals can include one or more gear access outputs or the access codes (e.g., for the new therapy gear module, such as the therapy gear module 200b). For example, the therapy controller 300 can be operably coupled to the container controller 410 in the manner that facilitates transfer of signals or data from the therapy controller 300 to the container controller 410. In an embodiment, the therapy controller 300 and container controller 410 can be operably wired together or can have a wireless connection. Moreover, the therapy controller 300 and container controller 410 can be operably coupled to the same network (e.g., local network, the Internet, cellular network, etc.), and the signals or data transfer between the therapy controller 300 and container controller 410 can be facilitated by the network and network appliances or devices (e.g., routers, switches, modems, etc.).

As described above, the therapy gear modules 200 can be associated with corresponding authentication identifiers (e.g., serial numbers, barcodes, etc.). In an embodiment, the therapy controller 300 can send the authentication identifiers for the specific therapy gear module(s) of the therapy gear modules 200 (e.g., the authentication identifiers can be included in the gear access outputs). For example, the container controller 410 can include or can be operably coupled to a database or lookup table that correlates authentication identifiers with the therapy gear modules 200 that correspond to the authentication identifiers. For example, the container controller 410 can allow the subject 10 to access the new therapy gear module (e.g., therapy gear module 200b) based at least partially on the authentication identifiers received from the therapy controller 300. For example, the container controller 410 can confirm or verify that the therapy gear module 200b is located in the corresponding storage container 400b of the storage containers 400 before providing the subject 10 with access to the storage containers 400b.

While in some embodiments access to the therapy gear modules 200 can be controlled by the access code (e.g., as described above), in other embodiments, the container controller 410 and the therapy controller 300 can be configured to provide the subject 10 with access to the new therapy gear module of the therapy gear modules 200 based on any suitable access control. In an embodiment, the therapy controller 300 can be operably coupled to an input device and configured to receive one or more identification signals therefrom, and the identification signals can be related to or can include subject-identification information (e.g., identification information about the subject 10).

For example, a biometric reader can be operably coupled to the therapy controller 300 or to the container controller 410 and can receive or scan one or more biometric characteristics of the subject 10, and the therapy controller 300 or the container controller 410 can receive one or more signals from the biometric reader responsive to the one or more biometric characteristics detected thereby. Moreover, as mentioned above, the container controller 410 can receive one or more gear access outputs from the therapy controller 300. In an embodiment, the container controller 410 (e.g., the control electrical circuitry thereof) can be configured to provide the subject 10 with access to the one or more new therapy gear modules of the therapy gear modules 200 (e.g., to the therapy gear module 200b) responsive to the received one or more access outputs or to the one or more signals from the biometric reader. It should be also appreciated that the signals or data from the biometric reader can be sent/received separately from the gear access output or can be included therein (e.g., the gear access output can include or can be at least partially based on the data or signals generated by the biometric reader responsive to scanning or identifying one or more biometric characteristics of the subject 10).

It should be also appreciated that any number of suitable devices can identify the subject 10 to the therapy controller 300 with a corresponding input thereto. Suitable input device that can be operably coupled to the therapy controller 300 and can identify the subject 10 and send subject-identification information to the therapy controller 300 can include an RFID scanner, a barcode scanner, or a mobile-device identifier, etc.

In some embodiments, the therapy controller 300 can be operably coupled to or integrated with a table or database that can be configured to log or store historical activity of the subject 10, to store health records of the subject 10, etc. Moreover, the therapy controller 300 can be operably coupled to a module or system operably coupled or configured to bill health insurance provider of the subject 10.

As described above, the therapy controller 300 can receive signals from one or more sensors and, based on the received signals, can identify one or more new therapy gear modules (e.g., can identify the therapy gear module 200b of the therapy gear modules 200). Moreover, the sensors can be positioned on or near the subject 10 or on or near one, some, or each of the therapy gear modules 200, such as to detect one or more therapy conditions; based at least partially on the detected therapy conditions, the therapy controller 300 can identify one or more new therapy gear modules. The following describes examples of therapy gear modules and the various suitable sensors that can be operably connected or integrated therewith.

Figure 2:
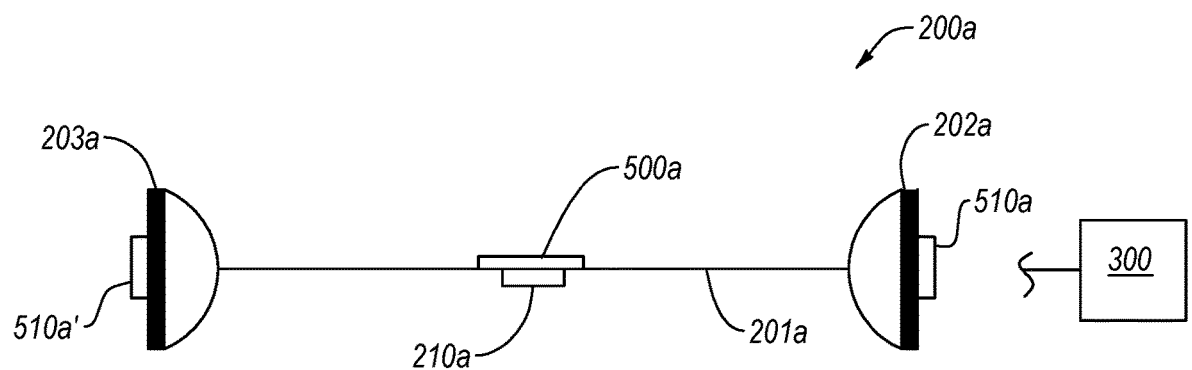
FIG. 2 is a schematic illustration of a therapy gear module for a therapy system, according to an embodiment.

FIG. 2 is a schematic illustration of a therapy gear module 200a, according to an embodiment. As mentioned above, the therapy gear module 200a can include an elastic exercise band (e.g., the subject can exercise one or more body portions by stretching the elastic band). According to the illustrated embodiment, the therapy gear module 200a can include an elastic band 201a. Generally, the elastic band 201a can be configured to elastically deform as the subject applies tensile force thereto by moving the ends thereof in opposite directions. The modulus of elasticity of the elastic band 201a or the force required to lengthen the elastic band 201a can vary from one embodiment to the next (and from one therapy gear module to another). Specifically, for example, the therapy gear module 200a can be selected or identified by the therapy controller 300 based at least partially on the modulus of elasticity of the elastic band 201a or the force required to lengthen the elastic band 201a. For example, the elastic band 201a may have any suitable or selected length or thickness (e.g., as selected or determined by the controller 300).

In some embodiments, the therapy gear module 200a can include one or more force gauges, such as a force sensor, a strain gauge, or a force gauge 500, operably coupled to the elastic band 201a and configured to determine the amount of force applied to the elastic band 201a by the subject. In an embodiment, the therapy controller 300 can receive signals from the force gauge 500; for example, the therapy controller 300 can be operably coupled to the elastic band 500 with a wired or a wireless connection. Based on the signals received from the force gauge 500, the therapy controller 300 can determine the amount of force that the subject applies to the elastic band 201a during exercises.

Additionally or alternatively, the therapy controller 300 can monitor or determine the change in force applied to the elastic band 201a by the subject. For example, the therapy controller 300 can compare the rate and profile of the change in force applied to the elastic band 201a (e.g., linear change, logarithmic change, generally nonlinear change, etc.) to a desired or selected profile of the change of force. Hence, for example, when the subject stretches the elastic band 201a smoothly or in an evenly paced manner, the change of the forces applied to the elastic band 201a can have a first shape; and the therapy controller 300 can compare the shape of the profile or the rate of change of forces applied to the elastic band 201a to a control shape or profile of the change of forces to determine whether the subject should use another therapy gear module.

Moreover, the therapy controller 300 can store the data based on the signals received from the force gauge 500, which can correspond to the exercises performed by the subject with the therapy gear module 200a. For example, the therapy controller 300 can determine whether the subject should receive a new therapy gear module (e.g., whether to generate one or more access outputs for one or more new therapy gear modules) based on the historic data, such as forces applied by the subject, force profiles, etc.

Additionally or alternatively, the therapy gear module 200a can include one or more acceleration sensors (e.g., accelerometers), such as acceleration sensors 510a, 510a'. In at least one embodiment, the therapy gear module 200a can include handles 202a and 203a attached to or integrated with opposing ends of the elastic band 201a of the therapy gear module 200a. Moreover, the therapy gear module 200a can have the acceleration sensors 510a, 510a' attached to or integrated with the handles 202a, 203a. The acceleration sensors 510a, 510a' can be operably coupled to the therapy controller 300 (e.g., in the same or similar manner as described above in connection with the force gauge 500).

In some embodiments, the therapy gear module 200a can include a force sensor, an acceleration sensor, a pressure sensor, a tactile sensor, or a light sensor. For example, one or more of the a force sensor, an acceleration sensor, a pressure sensor, a tactile sensor, or a light sensor can be positioned on one or more of the handles 202a, 203a to detect or sense movement of the subject's hands or force applied thereby onto the handles to produce the movement. Hence, in some embodiments, the therapy controller 300 can determine the level of subject's physical condition based at least in part on the signals received from the sensors as well as whether the subject should receive a new therapy gear module.

For example, as the subject moves the handles to stretch the therapy gear module 200a or to allow the therapy gear module 200a to compress or retract (e.g., partially or completely), the acceleration sensors 510a, 510a' can detect the acceleration of the subject's body portions that move the respective handles 202a, 203a. For example, the therapy controller 300 can determine whether the subject should receive a new therapy gear module or whether to generate one or more gear access outputs that would provide the subject access to the one or more new therapy gear modules (as described above). In an embodiment, the therapy controller 300 can be configured to determine speed (e.g., by integrating the acceleration output over a time interval), acceleration, change in acceleration, smoothness of movement, etc., of the handles 202a, 203a and compare one or more of the foregoing to one or more corresponding control values or profiles (e.g., value over time trends) of the same parameters. In an example, when the subject moves handles 202a, 203a in a manner that corresponds to one or more controls or is within a range of one or more controls for the speed of movement, acceleration of movement, etc., the therapy controller 300 can generate one or more access outputs that are configured to provide the subject with access to new therapy gear module(s), as described above.

As mentioned above, the therapy controller 300 can activate the 500a, 510a, 510a', or combinations thereof. For example, the therapy controller 300 can be configured to allow reception of signals from activated sensors and ignore signals from inactive sensors. In some embodiments, the therapy gear module(s) can include a controller. For example, the therapy gear module 200a can include a therapy-gear controller 210a that can be operably coupled to the therapy controller 300 (e.g., in a similar manner as described above in connection with the container controller 410 (FIG. 1)).

Moreover, the therapy-gear controller 210a can activate the therapy gear module 200a. In an embodiment, the therapy-gear controller 210a can be operably coupled to the 500a, 510a, 510a', or combinations thereof. For example, the therapy-gear controller 210a can receive one or more signals from the 500a, 510a, 510a' and can send the signals or data corresponding to the signals to the therapy controller 300. In an embodiment, the therapy controller 300 can send one or more gear access outputs or the authentication identifiers to the therapy-gear controller 210a, responsive to which the therapy-gear controller 210a can send the data or signals received from the 500a, 510a, 510a' to the therapy controller 300.

As mentioned above, the therapy controller 300 can include or can be operably coupled to an input device (e.g., that can identify or authenticate a user of the therapy gear module 200a). Additionally or alternatively, the therapy-gear controller 210a can be operably coupled to a similar device. Moreover, the therapy-gear controller 210a or the therapy controller 300 can include storage or can be operably coupled to a storage device and can be configured to store data related to the subject, responsive to receiving one or more authentication signals from the input device.

Hence, for example, the therapy-gear controller 210a or the therapy controller 300 can associate the activation of the therapy gear module 200a with a specific subject (e.g., as authenticated or identified by an input device). In an embodiment, the therapy-gear controller 210a or the therapy controller 300 can store one or more authentication profiles that correspond to different users or subjects that can be authorized to use the therapy gear module 200a (e.g., based on biometric identification, RFID card, barcode, electronic key, etc.). Furthermore, the therapy-gear controller 210a or the therapy controller 300 can store or correlate the signals received from the force gauge 500a or from the acceleration sensors 510a, 510a' or the data corresponding to the signals (e.g., force, acceleration, speed, etc.) with specific users or subjects, as authenticated by the input device. Additionally or alternatively, the therapy-gear controller 210a or the therapy controller 300 can store the signals or the data based at least partially on the signals from the force gauge 500a or from the acceleration sensors 510a, 510a' (e.g., force, acceleration, speed, etc.) in association with the specific user or subject who used the selected or identified therapy gear module 200a.

As mentioned above, other therapy gear modules can be similar to the therapy gear module 200a. For example, similar therapy gear modules (e.g., elastic bands) can be stiffer or less stiff than the current therapy gear module. Hence, for example, as the therapy controller 300 generates one or more gear access modules, other or new therapy gear modules (e.g., elastic bands that have lower or greater stretchability or require higher or lower force to extend the corresponding elastic bands thereof than the elastic exercise band used by the subject, such as the therapy gear module 200a). That is, for example, the therapy controller 300 can be configured to determine that the subject has graduated from one level to another level of exercise and can allow the subject to access new therapy gear module(s) that correspond with the next level.

Figure 3:
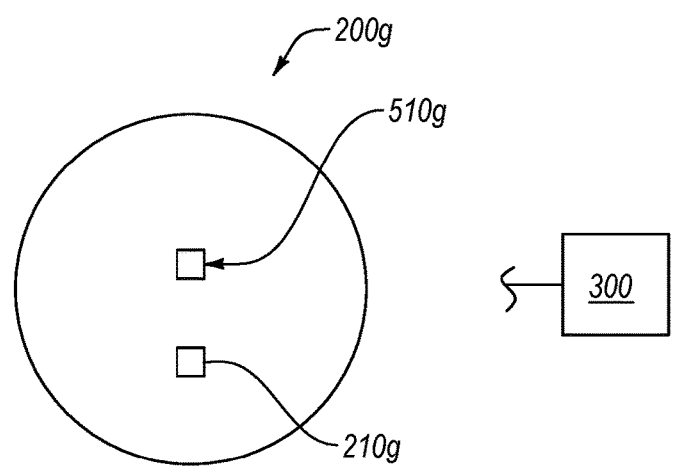
FIG. 3 is a schematic illustration of a therapy gear module for a therapy system, according to an embodiment.

As mentioned above, the therapy gear modules can vary from one embodiment to the next. FIG. 3 is a schematic illustration of a therapy gear module 200g, according to an embodiment. In the illustrated embodiment the therapy gear module 200g is configured as an exercise ball. Except as otherwise described herein, the therapy gear module 200g can be similar to or the same as any of the therapy gear modules described herein. Generally, the therapy gear module 200g can have any suitable weight. Moreover, the exercise ball of the therapy gear module 200g can have any number of suitable fillers to produce the suitable weight (e.g., the exercise ball can be gel-filled, fiber-filled, water-filled, etc.).

In an embodiment, the therapy gear module 200g can include an acceleration sensor 510g that can detect movement of the therapy gear module 200g as the subject uses the therapy gear module 200g or exercised therewith. Moreover, the acceleration sensor 510g can be operably coupled to the therapy controller 300. In some embodiments, the therapy gear module 200g can include a therapy-gear controller 210g. Hence, additionally or alternatively, the acceleration sensor 510g can be operably coupled to the therapy-gear controller 210g, which can be operably coupled to the therapy controller 300.

The therapy system can include additional therapy gear modules with different characteristics. For example, the therapy system can include exercise balls (similar to the therapy gear module 200g) that are heavier or lighter than the exercise ball of therapy gear module 200g. Hence, for example, the therapy controller 300 can generate one or more access outputs for accessing or activating one or more other exercise balls or sensors thereon (e.g., based at least partially on the signals received from the acceleration sensor 510g). Additionally or alternatively, exercise ball of the therapy gear module 200g can be configured to accept additional filler. For example, the therapy system can include therapy gear modules that comprise additional filler that can be added to the exercise ball of the therapy gear module 200g, thereby increasing the weight thereof.

In some embodiments, the therapy gear module 200g can be compressible and sized and shaped to fit into one or more hands of the subject. For example, the subject can exercise grip by squeezing the therapy gear module 200g. In an embodiment, the therapy gear module 200g can include resilient or compressible material therein (e.g., air, foam, gel, etc.), which can facilitate resistance therapy. Moreover, in some embodiments, the therapy gear module 200 can be reconfigured by changing the amount of air (or other fluid) therein, changing the density or resistance foam, changing the amount or consistency of the gel, etc., such as to increase or decrease the resistance of the therapy gear module 200g.

Figure 4:
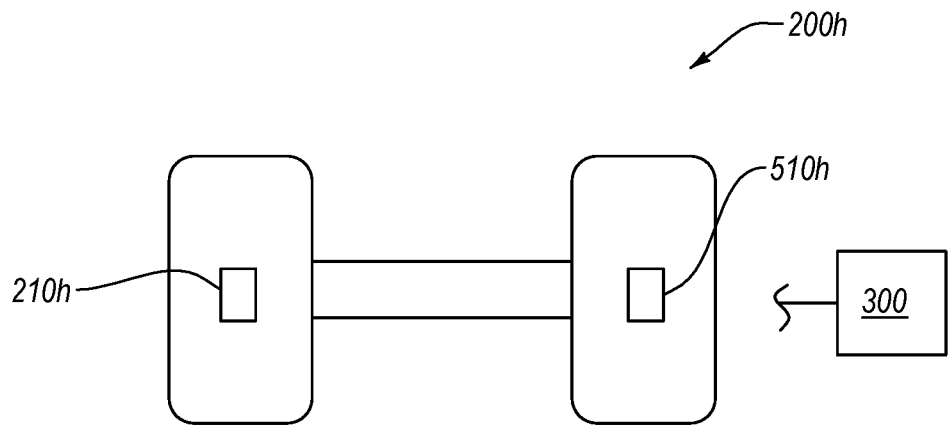
FIG. 4 is a schematic illustration of a therapy gear module for a therapy system, according to an embodiment.

FIG. 4 is a schematic illustration of a therapy gear module 200h, according to an embodiment. Specifically, in the illustrated embodiment the therapy gear module 200h is configured as a dumbbell. Except as otherwise described herein, the therapy gear module 200h can be similar to or the same as any of the therapy gear modules described herein.

In an embodiment, the therapy gear module 200h can include an acceleration sensor 510h that can detect movement of the therapy gear module 200h as the subject uses the therapy gear module 200h or exercises therewith. Moreover, the acceleration sensor 510h can be operably coupled to the therapy controller 300.

Additionally or alternatively, the acceleration sensor 510h can be operably coupled to the therapy gear module 200h, which can be operably coupled to the therapy controller 300. In some embodiments, the therapy gear module 200h can include therapy-gear controller 210h that can be operably coupled to the therapy controller 300 and to the acceleration sensor 510h. For example, the therapy-gear controller 210h can be configured to operate in the same or similar manner as the therapy-gear controller 210a (FIG. 2), described above.

The therapy system can include additional therapy gear modules with different characteristics. For example, the therapy system can include dumbbells (similar to the 200h) that are heavier or lighter than the dumbbells of therapy gear module 200h. Hence, for example, the therapy controller 300 can generate one or more access outputs for accessing or activating one or more other dumbbells or sensors thereon (e.g., based at least partially on the signals received from the acceleration sensor 510h).

In some embodiments, the new therapy gear modules can include one or more additional plates that can be configured to attach to the dumbbell(s). For example, the plates can be added to the existing plates to reconfigure the dumbbell(s) to a different, greater weight. Alternatively, the new plate can be configured to replace existing plates on the dumbbell(s), such as to reconfigured to weight of the dumbbells (e.g., to increase or decrease the weight).

Figure 5:
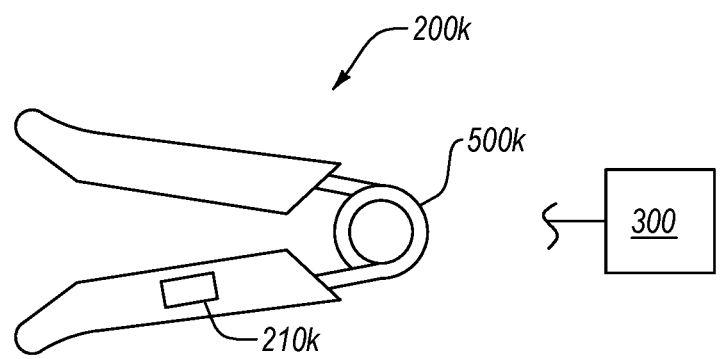
FIG. 5 is a schematic illustration of a therapy gear module for a therapy system, according to an embodiment.

FIG. 5 is a schematic illustration a therapy gear module 200k, according to an embodiment. Specifically, in the illustrated embodiment, the therapy gear module 200k is configured as a hand-grip exerciser. Except as otherwise described herein, the therapy gear module 200k can be similar to or the same as any of the therapy gear modules described herein. For example, the therapy gear module 200k can include a tensioned spring connecting opposing handles; the subject can squeeze the opposing handles in one hand, thereby exercising hand grip.

In an embodiment, the therapy gear module 200k can include a torque sensor or a force gauge 500k that can detect movement of the therapy gear module 200k as the subject uses the therapy gear module 200k or exercised therewith. Moreover, the force gauge 500k can be operably coupled to the therapy controller 300. In some embodiments, the therapy gear module 200k can include therapy-gear controller 210k that can be operably coupled to the therapy controller 300 and to the force gauge 500k and can be configured to operate in the same or similar manner as the therapy-gear controller 210a (FIG. 2), described above.

The therapy system can include additional therapy gear modules with different characteristics. For example, the therapy system can include hand-grip exercisers (similar to the hand-grip exerciser of the therapy gear module 200k) that have a tensioned spring with higher or lower tension setting than the hand-grip exerciser of the therapy gear module 200k. Hence, for example, the therapy controller 300 can generate one or more access outputs for accessing or activating one or more other hand-grip exercisers or sensors thereon (e.g., based at least partially on the signals received from the force gauge 500k).

In some embodiments, the therapy gear module 200k can include a torque sensor, an acceleration sensor, a pressure sensor, a tactile sensor, a kinesiometer, a goniometer, a light sensor, or an inclinometer. For example, one or more of the an acceleration sensor, a pressure sensor, a tactile sensor, a kinesiometer, a goniometer, a light sensor, or an inclinometer can be operably attached to or incorporated in one or more of the handles of the therapy gear module 200k.

Figure 6:
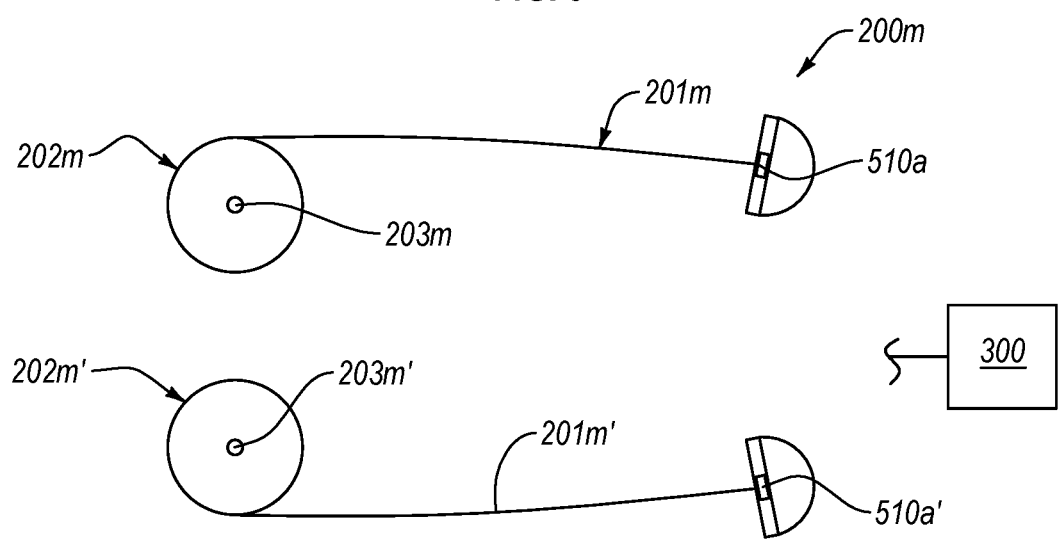
FIG. 6 is a schematic illustration of a therapy gear module for a therapy system, according to an embodiment.

FIG. 6 is a schematic illustration a therapy gear module 200m, according to an embodiment. Specifically, in the illustrated embodiment, the therapy gear module 200m is configured as a cable-pull exerciser. Except as otherwise described herein, the therapy gear module 200m can be similar to or the same as any of the therapy gear modules described herein. The therapy gear module 200m can include a therapy-gear controller 210m that can be similar to or the same as the therapy-gear controller 210a (FIG. 2). For example, the therapy-gear controller 210m can be operably coupled to the therapy controller 300 and can receive signals therefrom and transmit signals thereto.

In the illustrated embodiment, the therapy gear module 200m can include cables 201m, 201m' operably coupled to corresponding tension-controlled pulleys 202m, 202m'. For example, the tension-controlled pulleys 202m, 202m' can be operably coupled to corresponding friction controls 203m, 203m' that can control the resistance thereof. In an embodiment, the therapy-gear controller 210m can receive one or more gear access outputs from the therapy controller 300 and can modify the tension of the tension-controlled pulleys 202m, 202m' responsive to the one or more gear access outputs (e.g., the tension may be electronically controlled and may be modified by the controller 300, as described herein). For example, the therapy-gear controller 210m can direct the friction control 203m or the friction control 203m' to increase or decrease the friction experienced by the tension-controlled pulleys 202m, 202m' during rotation thereof, such as to increase or decrease the amount of force required for the subject to pull the cables 201m, 201m'.

In an embodiment, the therapy gear module 200m can include acceleration sensors 510m, 510m' that can detect movement of the handles attached to the cables 201m, 201m' as the subject uses the therapy gear module 200m or exercises therewith. Moreover, the acceleration sensors 510m, 510m' can be operably coupled to the therapy-gear controller 201m or to the therapy controller 300. Generally, the therapy-gear controller 210k can be configured to operate in the same or similar manner as the therapy-gear controller 210a (FIG. 2), described above. For example, the therapy-gear controller 210k can be operably coupled to the therapy controller 300 and can send signals or data based on the signals received from the acceleration sensors 510m, 510m'.

As described above, the therapy system can include additional therapy gear modules with different characteristics. Additionally or alternatively, however, the therapy gear system can modify characteristics of at least one of the one or more, such as to customize the therapy gear module 200m based on one or more gear access outputs generated by the therapy controller 300. For example, the therapy gear module 200m can include a customization module that can include the therapy-gear controller 210m and the friction controls 203m 203m' operably coupled thereto, which can collectively modify the tension of the 202m, 202m' and the force required for the subject to pull the cables 201m, 201m' of the therapy gear module 200m.

FIG. 7 is a schematic illustration a therapy gear module 200n, according to an embodiment. Specifically, in the illustrated embodiment, the therapy gear module 200n is configured as a treadmill. Except as otherwise described herein, the therapy gear module 200n can be similar to or the same as any of the therapy gear modules described herein. The therapy gear module 200n can include a therapy-gear controller 210n that can be similar to or the same as the therapy-gear controller 210a (FIG. 2).

For example, the therapy-gear controller 210n can be operably coupled to the therapy controller 300 and can receive signals therefrom and transmit signals thereto. Moreover, in an embodiment, the therapy gear module 200n can include a belt 201n and a drive assembly configured to advance the belt 201n at a selected speed. The therapy-gear controller 210n can be operably coupled to the drive assembly and can control the speed of the belt 201n.

For example, as described above, the therapy-gear controller 210n can receive one or more gear access outputs from the therapy controller 300 and can identify one or more new therapy gear modules. Moreover, in some embodiments, the therapy gear modules can be audiovisual gear modules (e.g., instructions on one or more media). For example, the new therapy gear modules can include a new setting for the speed of the belt 201n, which can be entered by the subject or received and implemented directly by the therapy-gear controller 210n. As described in more detail below, the gear access outputs can be based on one or more signals received by the therapy controller 300 from one or more sensors positioned near or on the subject.

For example, the therapy controller 300 can receive signals from heartrate sensor, breathing rate sensor, blood oxygen sensor, etc., and based on one or more of the received signals the therapy controller 300 can determine if the subject should have access to or should be provided a new therapy gear module. In some embodiments, the therapy-gear controller 210n can continuously adjust the speed of the belt 201n (to increase or decrease the speed) based on the gear access outputs received from the therapy controller 300. Hence, for example, as the subject uses or exercises on the treadmill of the therapy gear module 200n, additional therapy gear modules (e.g., speed settings, incline or decline settings, etc.) can be activated by the therapy-gear controller 210n after receiving the corresponding gear access outputs from the therapy controller 300.

As mentioned above, the therapy gear modules can include any number of suitable devices or machines. FIG. 8 is a schematic illustration of a therapy gear module 200p, according to an embodiment. Specifically, in the illustrated embodiment, the therapy gear module 200p is configured as a stationary exercise bike. Except as otherwise described herein, the therapy gear module 200p can be similar to or the same as any of the therapy gear modules described herein. The therapy gear module 200p can include a therapy-gear controller 210p that can be similar to or the same as the therapy-gear controller 210a (FIG. 2). For example, the therapy-gear controller 210p can be operably coupled to the therapy controller 300 and can receive signals therefrom and transmit signals thereto.

The therapy gear module 200p can include one or more pedals and a friction-controlled wheel assembly (not shown) that is rotated by movement of the pedals. In an embodiment, the therapy-gear controller 210p can be operably coupled to the friction-controlled wheel assembly and can control the amount of friction applied thereto, thereby controlling the amount of force required to move the pedals of the therapy gear module 200p. For example, the therapy-gear controller 210p can modify the amount of friction based on one or more gear access outputs received from the therapy controller 300.

In an embodiment, the therapy gear module 200p can include an acceleration sensor 510p that can be operably coupled to the 210p or to the therapy controller 300. For example, the gear access outputs can be based at least partially on the signals received from the acceleration sensor 510p. Additionally or alternatively, the gear access outputs can be based at least partially on the signals received from other sensors (e.g., heartrate sensor, breathing rate sensor, blood oxygen sensor, chemical sensor, etc.) by the therapy-gear controller 210p or by the therapy controller 300. Suitable chemical sensors can include an electrochemical sensor, a colorimetric sensor, or a transdermal sensor (e.g., ionotophoretic sensor, microneedle sensor, etc.) capable of sensing an analyte (e.g., lactic acid, hormone, electrolyte, etc.) in a biofluid (e.g., sweat, interstitial fluid, etc.).

Moreover, for example, the therapy-gear controller 210p can modify the friction applied to the friction-controlled wheel (to increase or decrease the friction) based at least partially on the signals or data received from the sensors. For example, the friction-controlled wheel can include an electronically controlled friction generator or modulator. In some embodiments, the electronically controlled friction modulator can be operably coupled to the therapy controller 300. In an embodiment, one or more signals received from the therapy controller 300 (e.g., via a wired connection or wirelessly) at the electronically controlled friction modulator can direct the electronically controller modulator to change the amount of resistance applied to the pedals (e.g., to increase or decrease the amount of resistance), thereby controlling the amount of force required for the subject to move the pedals of the therapy gear module 200p. In some embodiments, the electronically controller friction modulator can include one or more electromagnetic elements that may increase or decrease the amount of friction produced by the electrically controller friction modulator (e.g., responsive to a change in the voltage applied to the electromagnetic elements). It should be appreciated that, similar to the therapy gear module 200n (FIG. 7), additional or new therapy gear modules can be therapy gear modules that provide instructions to increase or decrease friction applied to the friction-controlled wheel.

FIG. 9 is a schematic illustration of a therapy gear module 200q, according to an embodiment. Specifically, in the illustrated embodiment, the therapy gear module 200q is configured as a rowing machine. Except as otherwise described herein, the therapy gear module 200q can be similar to or the same as any of the therapy gear modules described herein. The therapy gear module 200q can include a therapy-gear controller 210p that can be similar to or the same as the therapy-gear controller 210a (FIG. 2). For example, the therapy-gear controller 210q can be operably coupled to the therapy controller 300 and can receive signals therefrom and transmit signals thereto.

For example, the therapy gear module 200q can include a handle operably connected to a cable 201q that is connected to and configured to rotate a friction-controlled wheel assembly 202q that is rotated by movement of a cable 201q (e.g., in a manner that would simulate rowing movements). In an embodiment, the therapy-gear controller 210p can be operably coupled to the friction-controlled wheel assembly 202q and can control the amount of friction applied thereto, thereby controlling the amount of force required to move the pedals of the therapy gear module 200q. For example, the therapy-gear controller 210p can modify the amount of friction based on one or more gear access outputs received from the therapy controller 300.

In an embodiment, the therapy gear module 200q can include an acceleration sensor 510p that can be operably coupled to the therapy-gear controller 210p or to the therapy controller 300. For example, the gear access outputs can be based at least partially on the signals received from the acceleration sensor 510p. Additionally or alternatively, the gear access outputs can be based at least partially on the readings or signals received from other sensors (e.g., heartrate sensor, breathing rate sensor, blood oxygen sensor, etc.).

Moreover, as described above, the therapy controller 300 can generate the gear access outputs based on the signals received from the sensors. Hence, for example, the therapy-gear controller 210p can modify the friction applied to the friction-controlled wheel (to increase or decrease the friction) based at least partially on the signals received from the sensors. It should be appreciated that, similar to the therapy gear module 200p (FIG. 7), additional or new therapy gear modules can be audiovisual gear modules that correspond to increased or decreased friction applied to the friction-controlled wheel.

Figure 10:
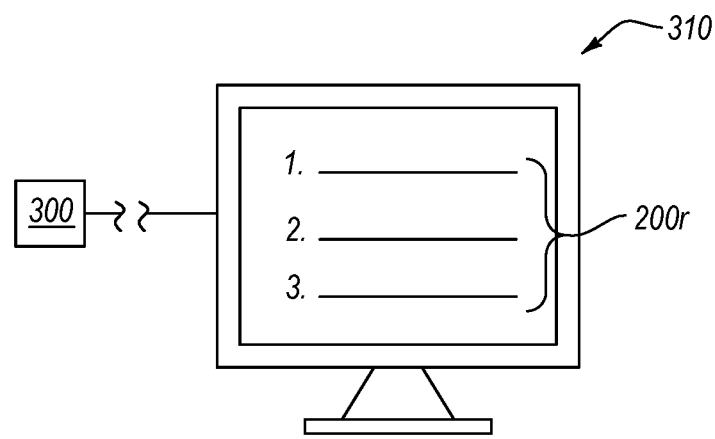
FIG. 10 is a schematic illustration of an output device configured to display a therapy gear module of a therapy system, according to an embodiment.

As described above, in some embodiments, the therapy gear modules can be audiovisual gear modules. For example, therapy gear modules can include instructions or sets of instructions that can be made available to the subject (e.g., exercise instructions). FIG. 10 is a schematic illustration of a therapy gear module 200r output to an output device, such as a display 310 that can be operably coupled to the therapy controller 300, according to an embodiment. It should be appreciated, however, that the suitable output devices that can output the instructions of the therapy gear module 200r can include other (e.g., non-video) suitable output devices, such as speakers, tactile output devices, etc.

In an embodiment, the therapy gear module 200r can include one or more instructions, as described above. In the illustrated embodiment, the instructions corresponding to the therapy gear module 200r are displayed to the user or subject on the display 310. Additionally or alternatively, the instructions corresponding to the therapy gear module 200r can be audio (e.g., voice, sounds, etc.), tactile (e.g., vibrations), etc. Moreover, the therapy gear module 200r can be identified by the therapy controller 300 based on one or more signals received from one or more sensors that can be located on or integrated with one or more exercise device or can be located on or near the subject (e.g., as described below in more detail).

In some embodiments, the therapy gear module 200r can include instructions for new exercises, exercises with increase intensity or weight, etc. Additionally or alternatively, the therapy gear module 200r can include instructions for retrieving or obtaining one or more other therapy gear modules. For example, the therapy gear module 200r can include instructions for purchasing the new therapy gear module(s) or equipment or instructions for using such therapy gear module(s) or equipment (e.g., the therapy gear module 200r can include one or more links to websites on the Internet or pages served on local network that can include further instructions on purchasing the therapy gear module(s)).

In some embodiments, the therapy controller 300 may automatically order or request one or more new therapy gear modules. For example, the subject may accept a subscription, and based at least in part on the subscription, the therapy controller 300 can be configured to order or deliver one or more new therapy gear modules to the subject. In some embodiments, the therapy controller 300 can be configured to send data or signals to a receiving controller (e.g., controller), which can correspond to signals or data received from one or more sensors. For example, the therapy controller 300 can send the data or signals at one or more selected intervals, the receiving controller can be configured to generate or request one or more new therapy gear modules.

It should be appreciated that therapy system can include multiple types of therapy gear modules (e.g., two or more of the therapy gear modules described above). Hence, for example, the new therapy gear module identified by the controller of the therapy system can be of a different type than the therapy gear module that is in use by the subject (e.g., the subject can be using an elastic band and the new therapy gear module can be identified as an exercise ball). Moreover, as mentioned above, therapy gear modules can include instructions. For example, the new therapy gear module can be instructions on using a previous therapy gear module in a different manner.

Furthermore, the therapy controller 300 can generate one or more reports responsive to the identified one or more physical conditions of the subject (e.g., based on the signal(s) received from the sensor(s) that may detect one or more therapy conditions, as described above). For example, the therapy conditions can include at least one of movement of one or more body portions of the subject, change in position of one or more portions of a current therapy gear module of a plurality of therapy gear modules, or force produced by a subject using the one or more current therapy gear modules. The therapy controller 300 can be configured to output the reports to one or more output devices, such as to the display 310. Additionally or alternatively, the therapy controller 300 can be configured to outputs the reports to any number of suitable output devices, such as a printer, sound generator (e.g., a speaker), etc.

As described below in more detail, the therapy controller 300 can be operably coupled to another controller, such as via a network (e.g., local network, Internet, etc.) and with a wired or wireless connection. For example, the other controller can include insurance information for the subject, health records, etc. The therapy controller 300 can send the reports the other controller. Furthermore, it should be appreciated that the therapy controller 300 can be configured to store the reports or the data corresponding to the reports (e.g., in memory, in an electronic storage, etc.).

Figure 11:
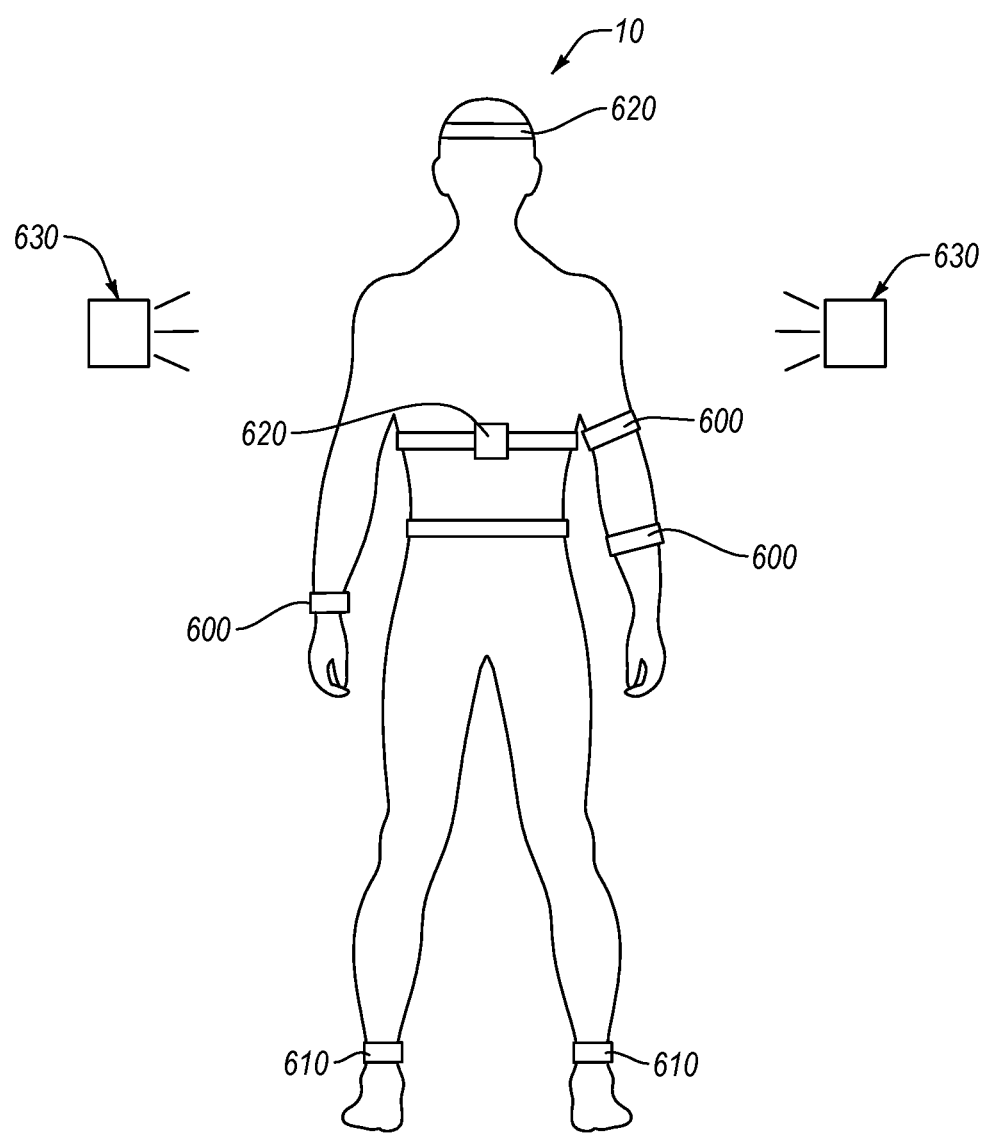
FIG. 11 is a schematic illustration of a subject and therapy gear system sensors located on and near the subject, according to an embodiment.

FIG. 11 is schematically illustrates various optional sensors that can be located on or near the subject 10, according to one or more embodiments. In an embodiment, one or more sensors can include wearable technology (e.g., sensor can be positioned near or in contact with the skin of the subject 10 or can be at least partially implanted or positioned for transdermal access), which can be associated with clothing or jewelry, be conformable to skin, or comprise stretchable electronics (e.g., epidermal electronics). That is, for example, one or more sensors can be positioned proximal to a dermal tissue (e.g., adjacent to the skin, attached to the skin, adhered to the skin, traversing the skin, etc.). For example, one or more acceleration sensors that can be positioned on or secured to extremities of the subject 10, such as acceleration sensors 600 secured to the arms of the subject 10 (e.g., near the wrists, above or below the elbow, etc.). Additionally or alternatively, one or more accelerations sensors can be secured to the legs of the subject 10 (e.g., near the ankles, above or below the knee, etc.). It should be appreciated that one or more additional or alternative acceleration sensors can be secured to other portions of the body of the subject 10 (e.g., torso, head, etc.).

In an embodiment, one or more physiological sensors can be located near or on the subject 10. For example, one or more heartrate sensors, blood oxygen level sensors, breathrate sensor, etc. (e.g., sensors 620) can be located near or on the subject 10. Generally, the above-described sensors (e.g., the sensors 600, 610, 620) can be included in or attached to one or more wearable devices, such as bands, clothing, smart watch, personal electronic device, etc. In some embodiments, one or more sensors can be implanted under the skin of the subject 10.

Additionally or alternatively, one or more external sensors (e.g., external sensors 630) can be positioned and configured to monitor movements of the subject 10 or one or more physiological conditions thereof. For example, the external sensors 630 can include one or more video cameras, thermal sensors, motion detectors, trackers (e.g., the subject 10 can wear a trackable device that can be tracked by the trackers), or combinations thereof. In an embodiment, the sensors 630 can determine movements of the 10 and changes therein.

Moreover, the sensors located on or near the body of the subject 10 or remotely therefrom can include at least one of a force sensor, an acceleration sensor, a pressure sensor, a tactile sensor, a kinesiometer, a light sensor, or an inclinometer. For example, a force sensor, an acceleration sensor, a pressure sensor, a tactile sensor, a kinesiometer, a light sensor, or an inclinometer can be positioned in one or more shoes or gloves of the subject 10 and can generate and send signals to the therapy controller; the signals can be responsive to or based on movement produced or forces experienced by the hands, feet, or legs of the subject 10 (e.g., as the subject 10 exercises). In an embodiment, the sensors located on or near the body of the subject 10 or remotely therefrom can be part of a mobile platform. It should be appreciated that, generally, the therapy controller can be configured to receive signals from one or more mobile devices as well as to send signals thereto.

Generally, one, some, or each of the sensors 600, 610, 620, 630 (or the sensors collectively) can determine movements of the subject 10 or one or more physiological properties or conditions related to the subject 10. Moreover, the sensors 600, 610, 620, 630 can be operably coupled to one or more of the therapy controller of the therapy system, the therapy-gear controller, or the container controller. For example, based at least in part on the signals (or data that is based on the signals) received from the sensors 600, 610, 620, 630, the therapy system controller can identify one or more new therapy gear modules or generate one or more gear access outputs configured to provide the subject 10 access to the one or more new therapy gear modules (as described above).

In some embodiments, the therapy system controller can determine that the new therapy gear module can or should have a different shape from the therapy gear module that is being used by the subject. For example, the therapy system controller can determine that one or more portions of the current therapy gear module can or must be modified (e.g., to produce the new therapy gear module). Additionally or alternatively, the new therapy gear module may have a generally the same shape as the therapy gear module that is being used by the subject, but may have a different density or weight.

In an embodiment, the therapy controller can be operably coupled to a gear fabrication module. The therapy controller can be configured to generate one or more gear determination outputs configured to request fabrication of the at least one new therapy gear module having the identified configuration, and the gear fabrication module can be configured to fabricate the at least one new therapy gear module having the selected configuration, responsive to receiving the one or more determination outputs. For example, the gear fabrication module can be configured to modify the at least one therapy gear module to produce the at least one new therapy gear module.

Figure 12:
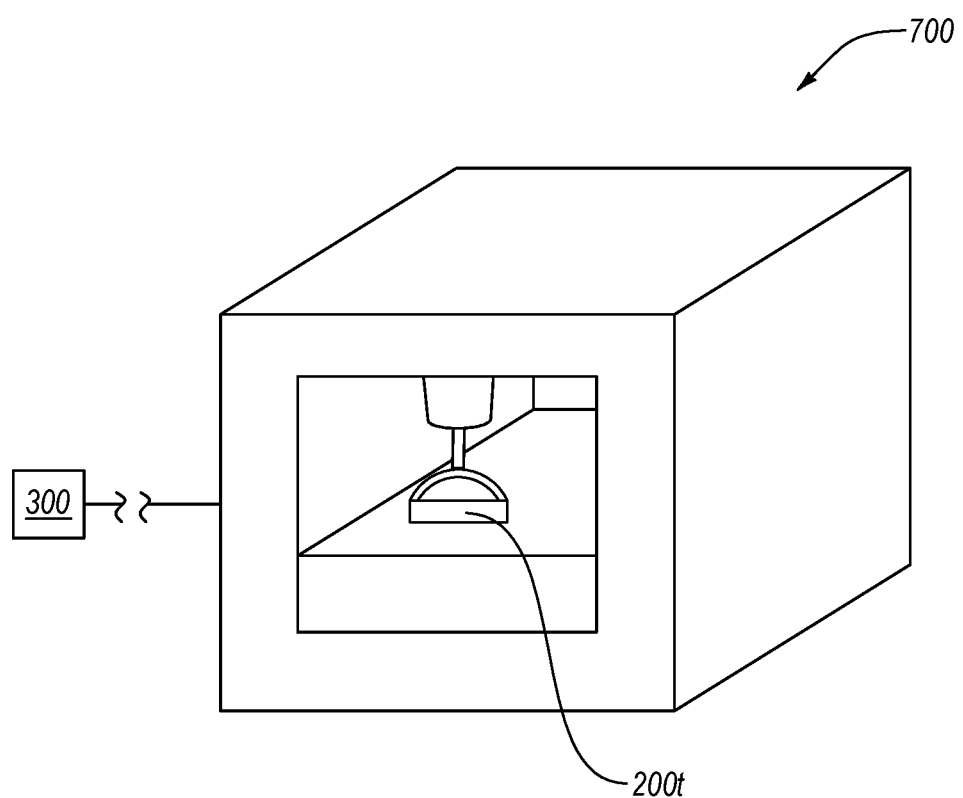
FIG. 12 is a schematic illustration of a 3D printer for a therapy system, according to an embodiment.

FIG. 12 is a schematic illustration of a therapy gear system that includes the therapy controller 300 operably coupled to a gear fabrication module that is configured as a 3D printer 700, according to an embodiment. As described above, the therapy controller 300 can identify new therapy gear modules (e.g., based at least partially on the signals received from the sensor(s), as described above). Generally, the 3D printer 700 can be configured to fabricate at least one new therapy gear. The 3D printer 700 can be chosen from any suitable commercially available 3D printer, such as stereolithography 3D printer, a selective laser sintering printer, a fused deposition modeling 3D printer, a multi-jet modeling 3D printer, or other suitable 3D printer.

In an embodiment, the therapy controller 300 can send one or more gear access outputs (e.g., related to the new therapy gear module(s)) to the 3D printer 700, such that the 3D printer 700 can build the new therapy gear module 200t or one or more portions thereof. For example, the therapy controller 300 can determine that the new therapy gear module is an elastic exercise band that has different handles than the elastic exercise band of the current therapy gear module. Hence, for example, the therapy controller 300 can direct the 3D printer 700 to build new handles, such that the subject can reconfigure the current therapy gear module to the new therapy gear module (e.g., the subject can change handles on the elastic exercise band to the new handles fabricated at the 700). As such, for example, the therapy system can provide custom or customized therapy gear modules to the subject 10. In some embodiments, the 3D printer can be included in or incorporated into a vending machine (e.g., the above-described vending machine can be configured to produce or fabricate new therapy gear modules in real time or on demand).

In an embodiment the gear fabrication module can include a heat-shaper or thermoformer configured to modify at least one therapy gear module of the plurality of therapy gear modules to produce the at least one new therapy gear module. For example, the heat-shaper or thermoformer can be configured to form therapy gear from a transiently pliable material (e.g., plastic, foam, elastomer, etc.), using a forming or molding technique such as, but not limited to, thermoforming, vacuforming, photoforming, electroforming, chemiforming, injection molding, blow molding, rotational molding.

In an embodiment, the therapy system can include an imager (not shown), such as at least one of a camera, 3D scanner, motion capture device, etc., which can be configured to capture an image of one or more body portions of the subject. The imager can be operably coupled to the control electrical circuitry of the therapy controller 300. For example, the control electrical circuitry of the therapy controller 300 can be configured to generate the one or more gear determination outputs at least partially responsive to one or more signals received from the imager.

In some embodiments, one or more new therapy gear modules can be fabricated or produced based at least in part on the data or signals received from the imager. For example, the data from the imager may correspond to one or more body portions of the subject, which may interface or interact with one or more corresponding portions of the new therapy gear module. For example, an on demand fabrication device, such as a 3D printer, may fabricate one or more new therapy gear modules or one or more therapy gear module portions that are configured to interface with the body portions of the subject and which are shaped in a manner that conforms thereto, such as based on the data provided by the imager. In some embodiments, a vending machine may accept a memory device, such as a flash drive, and may receive one or more specifications for the new therapy gear module. Moreover, the vending machine can include an imager that can be configured to scan or image one or more body portions of the subject. Moreover, the vending machine can be configured to fabricate the new therapy gear module based at least in part on the specifications for the new therapy gear module and based at least in part on the data received from the imager. For example, the new therapy gear module can include a hand grip; the vending machine can be configured to image one or more hands of the subject and fabricate the hand grip based at least in part on the data generated by the imager.

It will be understood that a wide range of hardware, software, firmware, or virtually any combination thereof can be used in the controllers described herein. In one embodiment, several portions of the subject matter described herein can be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more programs running on one or more processors (e.g., as one or more programs running on one or more microprocessors), as firmware, or as virtually any combination thereof. In addition, the reader will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution.

In a general sense, the various embodiments described herein can be implemented, individually and/or collectively, by various types of electro-mechanical systems having a wide range of electrical components such as hardware, software, firmware, or virtually any combination thereof; and a wide range of components that can impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs.

In a general sense, the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). The subject matter described herein can be implemented in an analog or digital fashion or some combination thereof.

The herein described components (e.g., steps), devices, and objects and the discussion accompanying them are used as examples for the sake of conceptual clarity. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, the reader can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably coupleable," to each other to achieve the desired functionality. Specific examples of operably coupleable include but are not limited to physically mateable and/or physically interacting components and/or wirelessly interactable and/or wirelessly interacting components and/or logically interacting and/or logically interactable components.

In some instances, one or more components can be referred to herein as "configured to." The reader will recognize that "configured to" or "adapted to" are synonymous and can generally encompass active-state components and/or inactive-state components and/or standby-state components, unless context requires otherwise.

While particular aspects of the present subject matter described herein have been shown and described, it will be apparent that, based upon the teachings herein, changes and modifications can be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, any recited operations therein can generally be performed in any order. Examples of such alternate orderings can include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, the various aspects and embodiments disclosed herein are for purposes of illustration and are not intended to be limiting, with the true scope and spirit being indicated by the following claims.

What is claimed is:

1. A modular personal therapy system, comprising:
a plurality of therapy gear modules, at least a portion of the plurality of therapy gear modules having a selected difficulty setting, the plurality of therapy gear modules including one or more current therapy gear modules usable by a subject;

one or more sensors positioned and configured to detect one or more therapy conditions while the one or more current therapy gear modules are being used by the subject, the one or more therapy conditions including at least one of an effect experienced by one or more portions of the one or more current therapy gear modules of the plurality of therapy gear modules, change in position of one or more portions of the one or more current therapy gear modules of the plurality of therapy gear modules, a magnitude of force applied to one or more portions of the one or more therapy gear modules, or a direction of force applied to one or more portions of the one or more therapy gear modules; and a controller including control electrical circuitry that is configured to:
  receive one or more signals from the one or more sensors, the one or more signals being associated with the one or more therapy conditions detected by the one or more sensors;
  identify one or more new therapy gear modules of the plurality of therapy gear modules separate from the one or more current therapy gear modules and inaccessible to the subject responsive to the one or more signals associated with the one or more therapy conditions received from the one or more sensors; and
  generate one or more gear access outputs configured to provide the subject access to the one or more new therapy gear modules, wherein the subject has access to the one or more new therapy gear modules only after the controller has generated the one or more gear access outputs to provide the subject the access to the one or more new therapy gear modules.

2. The modular personal therapy system of claim 1, wherein at least one of the one or more sensors is positioned proximally to the subject.

3. The modular personal therapy system of claim 1, wherein at least one of the one or more sensors is located on at least one therapy gear module of the plurality of therapy gear modules.

4. The modular personal therapy system of claim 1, wherein to identify the one or more new therapy gear modules, the control electrical circuitry is configured to generate one or more determination outputs that include identification information about the one or more new therapy gear modules.

5. The modular personal therapy system of claim 1, wherein the control electrical circuitry is further configured to:
  determine a difficulty level based on the one or more received signals; and
  identify the one or more new therapy gear modules for the subject based at least partially on the determined difficulty level.

6. The modular personal therapy system of claim 1, wherein each of the plurality of therapy gear modules has a different difficulty setting than other therapy gear modules of the plurality of therapy gear modules.

7. The modular personal therapy system of claim 1, wherein the plurality of therapy gear modules have the same difficulty settings.

8. The modular personal therapy system of claim 1, wherein the plurality of therapy gear modules include at least one of a stretchable resistance trainer, an electronic trainer including an electronic load generator, a stress ball, a stability training gear, a weight, a weighted ball, a hand-strengthening ball, a passive device, a treadmill, a cycle, or a rowing machine.

9. The modular personal therapy system of claim 1, wherein at least one therapy gear module of the plurality of therapy gear modules includes one or more of at least one audio instruction, at least one visual instruction, or at least one tactile instruction.

10. The modular personal therapy system of claim 1, further including:
  wherein the plurality of therapy gear modules include one or more gear authentication identifiers; and
  a gear-identifier detector configured to identify at least one therapy gear module of the plurality of therapy gear modules based on the one or more gear authentication identifiers.

11. The modular personal therapy system of claim 10, further including one or more informational modules configured to provide one or more of at least one audio instruction, at least one visual instruction, or at least one tactile instruction based at least partially on the one or more gear authentication identifiers.

12. The modular personal therapy system of claim 10, wherein:
  one or more gear access outputs are based at least partially on the one or more gear authentication identifiers; and
  at least one therapy gear module of the plurality of therapy gear modules includes a therapy-gear controller including controller electrical circuitry that is configured to receive the one or more access outputs from the controller and to activate the at least one therapy gear module responsive to the one or more gear access outputs.

13. The modular personal therapy system of claim 10, wherein:
  the one or more gear access outputs that are configured to provide the subject access to the one or more new therapy gear modules are based at least partially on the one or more gear authentication identifiers;
  the one or more new therapy gear modules include at least one sensor of the one or more sensors; and
  the control electrical circuitry of the controller is configured to accept signals from the at least one sensor of the one or more new therapy gear modules and ignore signals from other sensors of the one or more current therapy gear modules responsive to one or more gear access outputs.

14. The modular personal therapy system of claim 10, wherein the control electrical circuitry of the controller is configured to receive one or more signals from the gear-identifier detector, the one or more signals being based at least partially on the identified one or more gear authentication identifiers.

15. The modular personal therapy system of claim 1, wherein at least one sensor of the one or more sensors is included with at least one therapy gear module of the plurality of therapy gear modules.

16. The modular personal therapy system of claim 1, further including a storage container that includes a container controller including control electrical circuitry operably coupled to the control electrical circuitry of the controller, the storage container configured to store the one or more new therapy gear modules of the plurality of therapy gear modules.

17. The modular personal therapy system of claim 16, wherein the container controller is configured to:

receive one or more gear determination outputs from the controller; and responsive to the received one or more gear access outputs, provide access to the one or more new therapy gear modules.

18. The modular personal therapy system of claim 17, wherein the storage container includes at least one of a lockbox or a vending machine.

19. The modular personal therapy system of claim 18, wherein the one or more gear access outputs include an access code.

20. The modular personal therapy system of claim 17, further including:

a memory storage device selectively coupleable to the controller and to the container controller; and wherein the one or more access outputs are transferable from the controller to the container controller via the memory storage device.

21. The modular personal therapy system of claim 18, wherein the controller is operably coupled to the Internet and configured to send the one or more gear access outputs to another controller.

22. The modular personal therapy system of claim 1, wherein the one or more sensors are configured to detect at least one of a force applied by the subject on at least one therapy gear module of the plurality of therapy gear modules, speed of movement of the one or more body portions of the subject, or acceleration of the one or more body portions of the subject.

23. The modular personal therapy system of claim 22, wherein the control electrical circuitry of the controller is further configured to determine a smoothness of movement of the one or more body portions of the subject responsive to the one or more signals received from the one or more sensors.

24. The modular personal therapy system of claim 1, wherein the one or more sensors are configured to detect at least one of a force experienced by at least one therapy gear module of the plurality of therapy gear modules, speed of movement experienced by at least of the one or more body portions of the subject, or acceleration of the one or more body portions of the subject.

25. The modular personal therapy system of claim 1, wherein the one or more sensors include at least one of a force sensor, an acceleration sensor, a pressure sensor, a tactile sensor, a kinesiometer, a goniometer, or an inclinometer.

26. The modular personal therapy system of claim 1, wherein the one or more sensors include at least one physiological characteristics sensor configured to detect one or more physiological characteristics of a subject.

27. The modular personal therapy system of claim 1, wherein at least one therapy gear module of the plurality of therapy gear modules includes a therapy-gear controller including controller electrical circuitry that is configured to receive the one or more access outputs from the controller and to activate the at least one therapy gear module responsive to the one or more gear access outputs.

28. The modular personal therapy system of claim 1, wherein at least one therapy gear module of the plurality of therapy gear modules includes a customization module configured to customize the at least one therapy gear module responsive to the one or more gear access outputs.

29. The modular personal therapy system of claim 28, wherein the at least one therapy gear module includes a tension-controlled pulley, and the customization module is configured to control the tension of the tension-controlled pulley responsive to the one or more gear access outputs.

30. The modular personal therapy system of claim 28, wherein the at least one therapy gear module includes a pulley, and the customization module includes a friction control for controlling force required for rotating the pulley responsive to the one or more access outputs.

31. The modular personal therapy system of claim 1, wherein the control electrical circuitry of the controller is operably coupled to an input device and configured to receive one or more authentication signals therefrom, the one or more authentication signals being related to subject-identification information.

32. The modular personal therapy system of claim 1, wherein the controller is configured to send to at least one second controller one or more signals related to the one or more signals received from the one or more sensors.

33. The modular personal therapy system of claim 1, wherein the control electrical circuitry of the controller is operably coupled to one or more of a medical records database or medical records table that includes health records of the subject.

34. The modular personal therapy system of claim 1, wherein the one or more therapy conditions includes at least the effect experienced by the one or more portions of the one or more current therapy gear modules of the plurality of therapy gear modules.

35. The modular personal therapy system of claim 1, wherein the one or more therapy conditions includes at least the change in position of one or more portions of the one or more current therapy gear modules of the plurality of therapy gear modules.

36. The modular personal therapy system of claim 1, wherein the one or more therapy conditions includes at least the magnitude of force applied to one or more portions of the one or more therapy gear modules.

37. The modular personal therapy system of claim 1, wherein the one or more therapy conditions includes at least the direction of force applied to one or more portions of the one or more therapy gear modules.

38. The modular personal therapy system of claim 17, wherein the container controller is configured to provide the subject one-time access to the one or more new therapy gear modules.

39. The modular personal therapy system of claim 17, wherein the container controller is configured to provide the subject access to the one or more new therapy gear modules a selected number of times.

40. The modular personal therapy system of claim 1, wherein the controller is configured to generate one or more gear access outputs configured to unlock the one or more new therapy gear modules for the subject.

41. A method of providing personal therapy to a subject, the method comprising:

at a controller, receiving one or more signals from one or more sensors configured to detect change in position of one or more portions of one or more current therapy gear modules used by the subject;

at the controller, identifying one or more new therapy gear modules separate from the one or more current therapy gear modules and inaccessible to the subject responsive to the one or more signals received from the one or more sensors; and at the controller, generating one or more gear access outputs to provide the subject access to the identified one or more new therapy gear modules, wherein the subject has access to the one or more new therapy gear modules only after the controller has generated the one or more gear access outputs to provide the subject the access to the one or more new therapy gear modules.

42. The method of claim 41, wherein generating the one or more access outputs includes generating one or more access outputs that include identification information about the one or more new therapy gear modules.

43. The method of claim 41, further including:
wherein providing to the subject access to the identified one or more new therapy gear modules includes, at the controller, generating one or more access outputs; and
at a gear storage container, receiving the one or more access outputs to allow the subject to access at least one of the one or more new therapy gear modules.

44. The method of claim 41, wherein generating one or more gear determination outputs configured to provide the subject access to the one or more new therapy gear modules includes, at the controller, determining a smoothness of movement of one or more body portions of the subject responsive to the one or more signals received from the one or more sensors.

* * * * *